(12) United States Patent
Kii

(10) Patent No.: US 10,291,802 B2
(45) Date of Patent: May 14, 2019

(54) DOCUMENT READER

(71) Applicant: SEIKO EPSON CORPORATION, Tokyo (JP)

(72) Inventor: Soichiro Kii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 15/917,349

(22) Filed: Mar. 9, 2018

(65) Prior Publication Data

US 2018/0278773 A1    Sep. 27, 2018

(30) Foreign Application Priority Data

Mar. 23, 2017   (JP) .................................. 2017-057147

(51) Int. Cl.
*H04N 1/00* (2006.01)

(52) U.S. Cl.
CPC ..... *H04N 1/00554* (2013.01); *H04N 1/00557* (2013.01)

(58) Field of Classification Search
CPC ................................................ H04N 1/00554
See application file for complete search history.

(56) References Cited

U.S. PATENT DOCUMENTS

| | | | | |
|---|---|---|---|---|
| 6,593,999 B1* | 7/2003 | Hosaka | ................ | G03G 15/605 271/265.01 |
| 6,957,037 B2* | 10/2005 | Terae | .................... | G03G 15/605 355/76 |
| 2004/0218229 A1* | 11/2004 | Chol | .................. | H04N 1/00519 358/474 |
| 2004/0228082 A1* | 11/2004 | Tiao | .................... | H04N 1/00519 361/679.27 |
| 2005/0042006 A1* | 2/2005 | Qian | .................. | H04N 1/00519 399/380 |
| 2005/0044664 A1* | 3/2005 | Chang | ................ | H04N 1/00543 16/327 |
| 2005/0134940 A1* | 6/2005 | Shyu | .................. | H04N 1/00519 358/474 |
| 2005/0246862 A1* | 11/2005 | Chen | ..................... | E05D 7/1055 16/221 |

(Continued)

FOREIGN PATENT DOCUMENTS

| JP | 07-21928 A | 8/1995 | | |
|---|---|---|---|---|
| JP | 2001159797 A | * | 6/2001 | .......... G03G 15/605 |

(Continued)

*Primary Examiner* — Ted W Barnes
(74) *Attorney, Agent, or Firm* — Workman Nydegger

(57) ABSTRACT

A document reader includes: a scanner unit; an ADF; a hinge that connects the scanner unit and the ADF in a way that the ADF is openable from and closable to the scanner unit by turning around a turn shaft of the hinge; and a positioning mechanism. The hinge includes a pressing member that holds the ADF open, and is arranged on a back side of the scanner unit with the turn shaft located above the pressing member. The positioning mechanism includes: a projecting portion located below the turn shaft, and formed on a surface of the hinge intersecting an axial direction of the turn shaft; a slit formed in the scanner unit, and brought into engagement with the projecting portion; and an adjusting screw that presses a lower part of the hinge from the back side of the scanner unit.

8 Claims, 25 Drawing Sheets

(56) References Cited

U.S. PATENT DOCUMENTS

| | | | | |
|---|---|---|---|---|
| 2007/0251056 A1* | 11/2007 | Aoyagi | ................ | G03G 15/60 16/221 |
| 2009/0219706 A1* | 9/2009 | Satoh | ................ | H04N 1/00519 361/807 |
| 2010/0040398 A1* | 2/2010 | Shin | ................ | G03G 15/605 399/367 |
| 2010/0061758 A1* | 3/2010 | Kakuta | ................ | H04N 1/00543 399/110 |
| 2012/0050826 A1* | 3/2012 | Iwata | ................ | H04N 1/00554 358/498 |
| 2013/0119842 A1* | 5/2013 | Tzeng | ................ | H05K 5/0226 312/325 |
| 2014/0023416 A1* | 1/2014 | Suzuki | ................ | H04N 1/00554 399/380 |
| 2015/0015920 A1* | 1/2015 | Muraoka | ................ | H04N 1/00543 358/400 |
| 2015/0067986 A1* | 3/2015 | Lee | ................ | E05F 1/1261 16/321 |
| 2015/0116796 A1* | 4/2015 | Urita | ................ | H04N 1/10 358/497 |
| 2016/0065769 A1* | 3/2016 | Miyase | ................ | H04N 1/00557 358/497 |
| 2016/0065770 A1* | 3/2016 | Kurotsu | ................ | H04N 1/00559 358/497 |
| 2016/0134769 A1* | 5/2016 | Yamamoto | ................ | H04N 1/00554 358/449 |
| 2016/0369544 A1* | 12/2016 | Yonemoto | ................ | E05D 11/082 |
| 2017/0070626 A1* | 3/2017 | Ikeda | ................ | H04N 1/00554 |
| 2017/0126910 A1* | 5/2017 | Miura | ................ | B41J 29/02 |
| 2017/0155782 A1* | 6/2017 | Okazawa | ................ | H04N 1/00554 |

FOREIGN PATENT DOCUMENTS

| | | | | | |
|---|---|---|---|---|---|
| JP | 2004177932 A | * | 6/2004 | ................ | G03G 15/605 |
| JP | 2007300247 A | * | 11/2007 | ................ | G03G 15/60 |
| JP | 2010028465 A | * | 2/2010 | ................ | H04N 1/00519 |
| JP | 2010066339 A | * | 3/2010 | ................ | H04N 1/00543 |
| JP | 2011-017391 A | | 1/2011 | | |
| JP | 2011112967 A | * | 6/2011 | ................ | H04N 1/00519 |
| JP | 5336334 B2 | * | 11/2013 | ................ | H04N 1/00519 |
| JP | 2015018088 A | * | 1/2015 | ................ | H04N 1/00543 |
| JP | 2015068867 A | | 4/2015 | | |
| JP | 2015087676 A | * | 5/2015 | ................ | H04N 1/10 |
| JP | 2016-173470 A | | 9/2016 | | |
| JP | 2016173470 A | * | 9/2016 | | |
| JP | 2017011444 A | * | 1/2017 | ................ | E05D 11/082 |
| JP | 2017055163 A | * | 3/2017 | ................ | H04N 1/00554 |
| JP | 2017085469 A | * | 5/2017 | ................ | B41J 29/02 |
| JP | 2017103595 A | * | 6/2017 | ................ | H04N 1/00554 |
| JP | 2018112632 A | * | 7/2018 | ................ | H04N 1/00554 |

* cited by examiner

FIG. 8
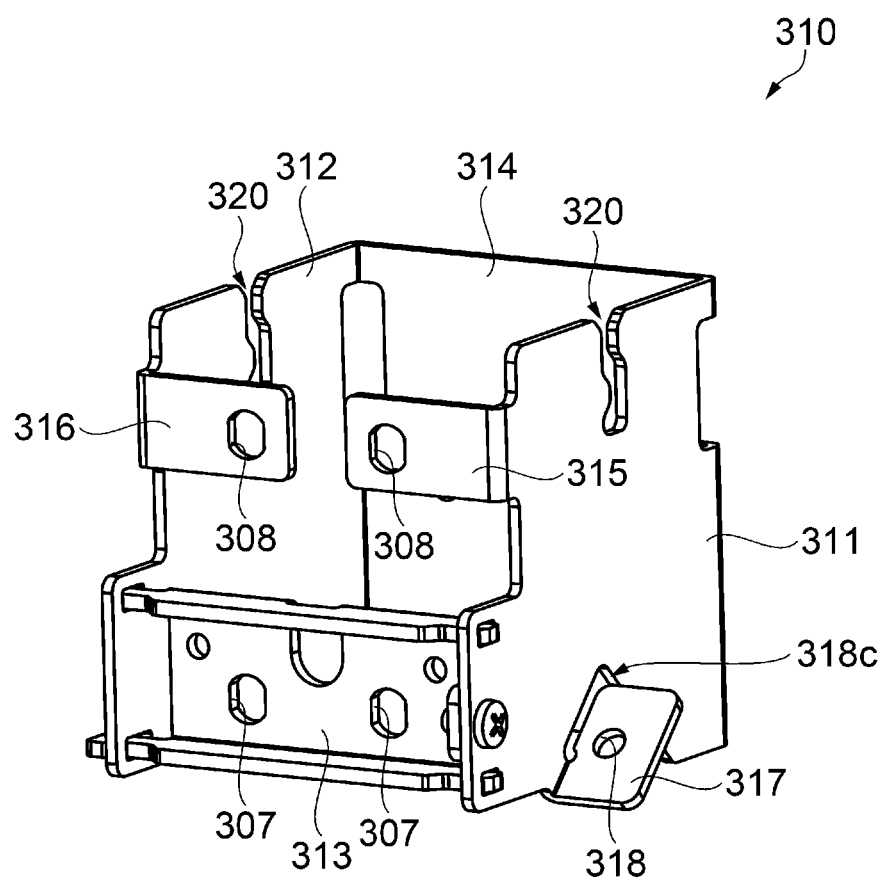
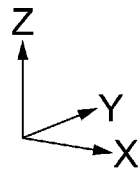

DOCUMENT READER

INCORPORATION BY REFERENCE

The entire disclosure of Japanese Patent Application No. 2017-057147, filed on Mar. 23, 2017 is expressly incorporated by reference herein.

BACKGROUND

1. Technical Field

The present disclosure relates to a document reader typified by a scanner and the like.

2. Related Art

A document reader typified by a scanner and the like is provided with an opening/closing body that opens and closes a platen, and that presses a document against the platen when closed. The opening/closing body may be a simple cover or an automatic document feeder (hereinafter abbreviated to ADF). Furthermore, there has been proposed a document reader to which the opening/closing body is connected using a hinge mechanism (hereinafter abbreviated to a hinge) in a way that the opening/closing body can turn relative to the platen and be held open at a predetermined turning angle (opening angle) to the platen (for example, JP-A-2016-173470).

In the document reader disclosed in JP-A-2016-173470, the opening/closing body has a document feeding mechanism (for example, a motor, a cam, a belt, a shaft and the like), and is accordingly heavier than in the case where the opening/closing body is a simple cover. The hinge turnably supports the heavy opening/closing body.

SUMMARY

As for the document reader disclosed in JP-A-2016-173470, however, a configuration for precisely positioning the opening/closing body relative to the platen is not disclosed. In addition, assembling the heavy opening/closing body with the platen using the hinge involves a problem of difficulty in accurately positioning the heavy opening/closing body relative to the platen.

An advantage of some aspects of the disclosure is to solve the above problem at least partially. The disclosure can be represented as the following embodiment or application examples.

Application Example 1

A document reader according to the application example is characterized in that the document reader includes a document reading unit that includes a mount table, and reads a document mounted on the mount table, a cover unit that is arranged to cover an upper surface of the document reading unit, and is movable relative to the platen between an open state and a closed state, a hinge that connects the document reading unit and the cover unit in a way that the cover unit is openable from and closable to the document reading unit by turning around a turn shaft of the hinge, and a positioning mechanism that puts the document reading unit and the cover unit in place in an apparatus front-rear direction, in which the hinge includes a pressing member that holds the cover unit in the open state, and is arranged on a back side of the document reading unit with the turn shaft located above the pressing member and with a pressing direction of the pressing member coinciding with a direction in which the cover unit covers the document reading unit, and the positioning mechanism includes an engaging portion located below the turn shaft, and arranged on a surface of the hinge that intersects an axial direction of the turn shaft, an engaged portion that is formed in the document reading unit, and is engaged with the engaging portion, and a pressing portion that is located below positions of the engaging portion and the engaged portion, and presses a lower part of the hinge from the back side of the document reading unit.

The positioning mechanism includes: the engaging portion; the engaged portion engaged with the engaging portion; and the pressing portion that presses the lower part of the hinge from the back side of the document reading unit. The positioning mechanism is capable of putting the document reading unit and the hinge in place in the apparatus front-rear direction with high precision. For example, the cover unit can be assembled with the document reading unit with high precision by: first, attaching the cover unit to the hinge; thereafter, assembling the hinge, to which the cover unit is attached, with the document reading unit; and adjusting the apparatus front-rear direction positions of the document reading unit and the hinge using the positioning mechanism with the cover unit attached to the hinge.

For this reason, even in a case where the cover unit includes a document transporting mechanism and is accordingly heavier than if the cover unit would be a simple cover, the heavy cover unit can be positioned relative to the document reading unit.

Application Example 2

Preferably, in the document reader according to the application example, the engaging portion is formed on a case that houses the pressing member, and the pressing member presses the case.

Because the pressing member presses a force countering the weight of the cover unit against the cover unit from the hinge, the cover unit can be held in an open-state orientation and in a closed-state orientation. Furthermore, since the pressing portion presses the case, the apparatus front-rear direction positions of the document reading unit and the hinge to which the cover unit is attached can be adjusted with the cover unit held in the open-state orientation and in the closed-state orientation.

Application Example 3

Preferably, in the document reader according to the application example, a plurality of the hinges are arranged, and the positioning mechanism is used to put the document reading unit and the hinges in place in the apparatus front-rear direction.

Since the multiple hinges are arranged and the apparatus front-rear direction positions of the document reading unit and each hinge are adjusted using the positioning mechanism, the cover unit can be more stably connected to a mount table (the document reading unit) in a way that the cover unit is openable from and closable to the document reading unit, and additionally the accuracy in the apparatus front-rear direction position of the cover unit relative to the document reading unit can be made higher, than if a single hinge were arranged.

Application Example 4

Preferably, in the document reader according to the application example, the mount table includes a first recessed portion on which to mount the document, and the cover unit includes a document cover unit that is arranged to internally contact the first recessed portion in the closed state.

Since the document cover unit to be arranged to internally contact the first recessed proportion in the closed state is provided, and together with the mount table, presses the document mounted in the first recessed portion, the orientation of the document can be corrected to a right one, and the document can be read appropriately.

Application Example 5

Preferably, in the document reader according to the application example, the document reading unit includes a reading window through which to read a document being transported, and the cover unit includes a document transporter that transports the document to the reading window.

Since the document reading unit includes the reading window through which to read the document and the cover unit includes the document transporter that transports the document to the reading window, the document can be read by transporting the document to the reading window.

Application Example 6

Preferably, the document reader according to the application example further includes a second recessed portion formed on a free end side of the cover unit at least away from the document reading unit, and a projecting portion arranged on the document reading unit, in which the positioning mechanism is fixed in a state where the document reading unit and the cover unit are put in place with the second recessed portion and the projecting portion engaged with each other.

The state where the second recessed portion of the cover unit and the projecting portion of the document reading unit are engaged with each other is a state where the cover unit and the document reading unit are put in place appropriately. Since the positioning mechanism is fixed with the cover unit and the document reading unit fixed together after the second recessed portion of the cover unit and the projecting portion of the document reading unit are engaged with each other, the cover unit and the document reading unit can be fixed together with the cover unit and the document reading unit put in place appropriately.

Application Example 7

Preferably, in the document reader according to the application example, the projecting portion is detachably attachable to a third recessed portion formed in the document reading unit, and in an attached state, the document reading unit and the cover unit are put in place with the projecting portion fitted in the second recessed portion of the cover unit.

Since the projecting portion is attachable to and detachable from the third recessed portion, no unnecessary projecting portion is formed on the document reading unit in a case where no projecting portion is needed on the document reading unit as long as the projecting portion is not attached to the third recessed portion. In a case where the projecting portion is needed on the document reading unit in order to put the cover unit and the document reading unit in place appropriately, the projecting portion is formed on the document reading unit by attaching the projecting portion to the third recessed portion of the document reading unit, and the projecting portion of the document reading unit and the second recessed portion of the cover unit are engaged with each other. Thereby, the document reading unit and the cover unit can be put in place appropriately.

Application Example 8

Preferably, in the document reader according to the application example, the document reading unit is openable from a structure under the document reading unit by turning around a turn axis located below the turn shaft of the hinge, and the second recessed portion is formed from a through-hole, the third recessed portion to which the projecting portion is detachably attachable includes a second through-hole that is opened to an inside of the document reading unit when the projecting portion is detached from the third recessed portion, and the cover unit and the document reading unit are fastened together using the through-hole and the second through-hole.

Since the second recessed portion of the cover unit is formed from the through-hole and the second through-hole is provided to the third recessed portion of the document reading unit, unexpected opening of the cover unit from the document reading unit can be prevented by fastening the cover unit and the document reading unit using the through-hole and the second through-hole.

BRIEF DESCRIPTION OF THE DRAWINGS

The disclosure will be described with reference to the accompanying drawings, wherein like numbers reference like elements.

FIG. 8 is a perspective view of a fixing member.

FIG. 25 is a schematic view illustrating what condition a first fixing section is in.

FIG. 26 is a schematic view illustrating what condition a fourth fixing section is in.

FIG. 27 is a schematic view illustrating what condition a fifth fixing section is in.

DESCRIPTION OF EXEMPLARY EMBODIMENTS

Figure 1:
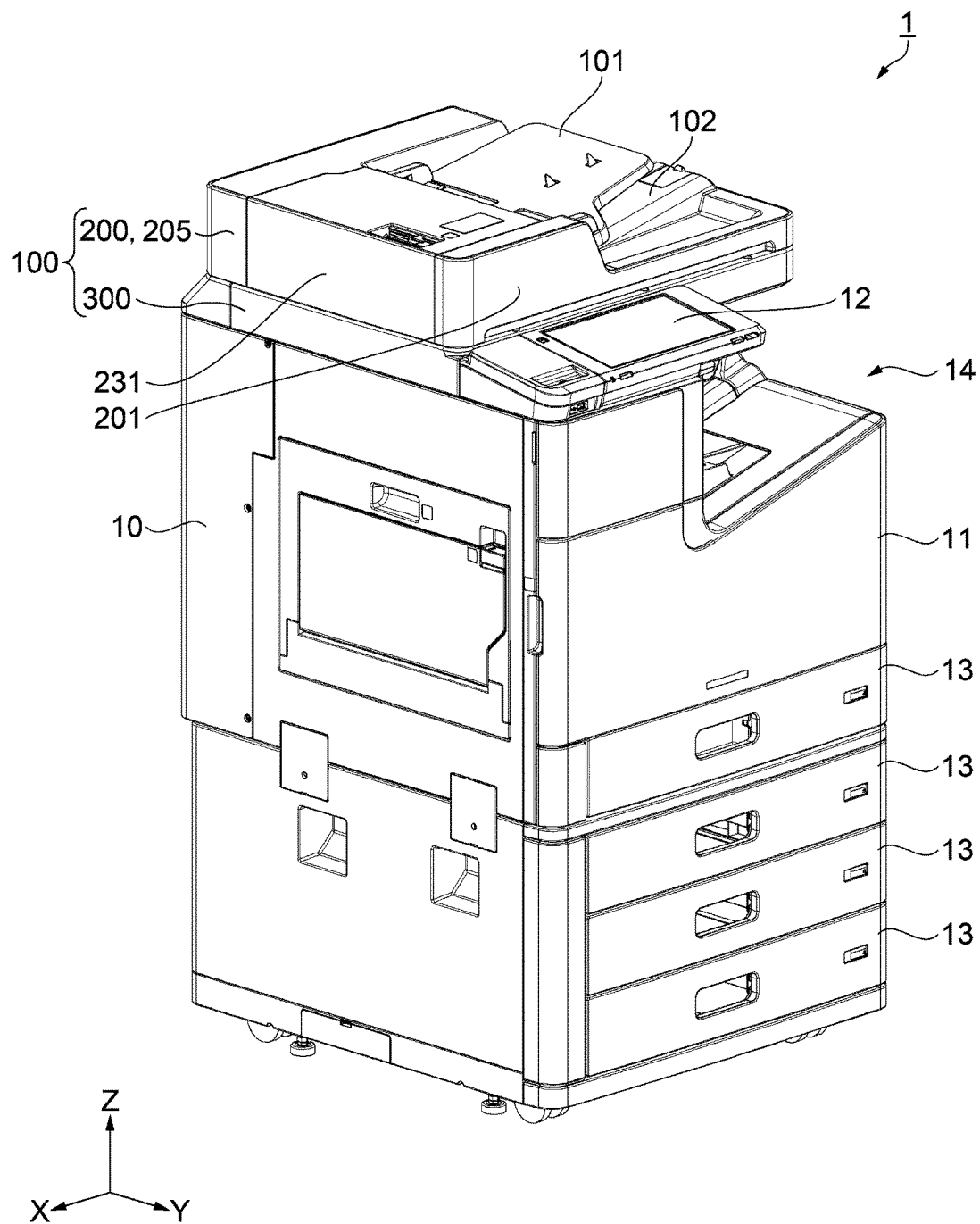
FIG. 1 is a perspective view of a printing system including a document reader according to an embodiment.

Referring to the drawings, descriptions will be hereinbelow provided for an embodiment of the present disclosure. This embodiment shows an aspect of the present disclosure, but does not limit the present disclosure. This embodiment can be arbitrarily modified within the scope of the technical thought of the present disclosure. In addition, in the drawings given below, the scale of each layer and the scale of each component are different from the actual ones for the purpose of illustrating the layer and the component in recognizable sizes on the drawings.

Embodiment

Figure 3:
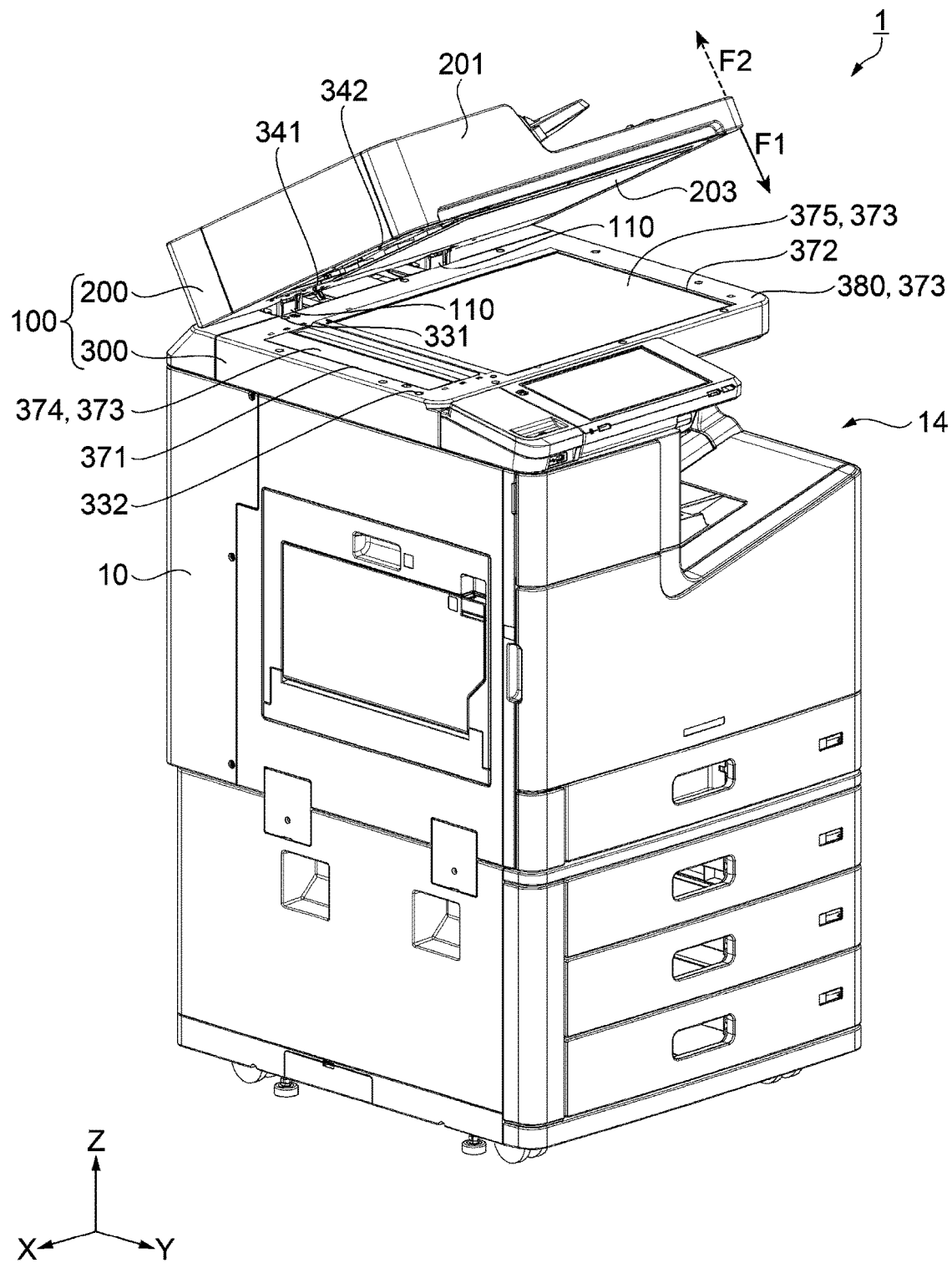
FIG. 3 is yet another perspective view of the printing system including the document reader according to the embodiment.
Figure 4:
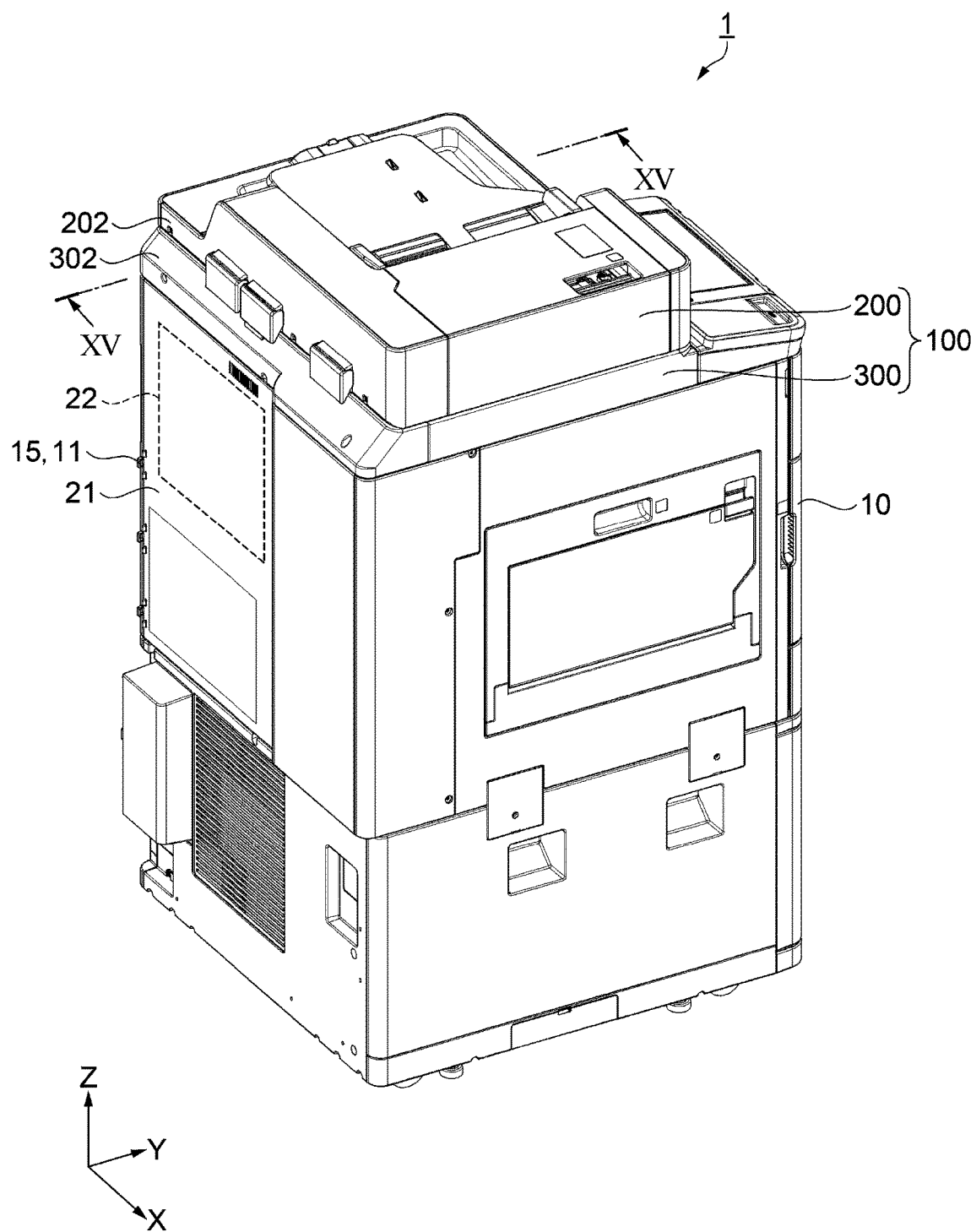
FIG. 4 is the other perspective view of the printing system including the document reader according to the embodiment.
Figure 5:
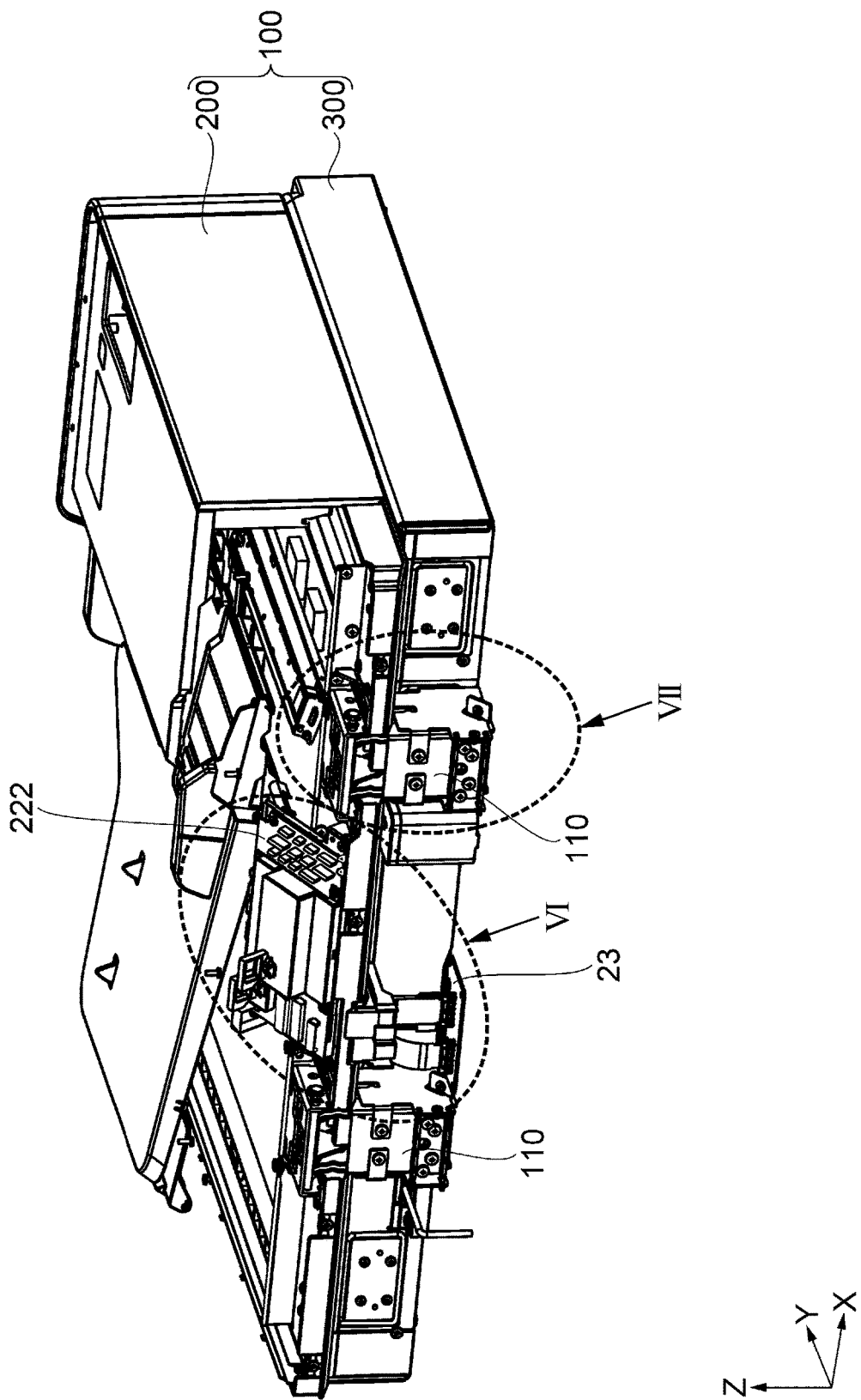
FIG. 5 is a perspective view of the document reader according to the embodiment.
Figure 6:
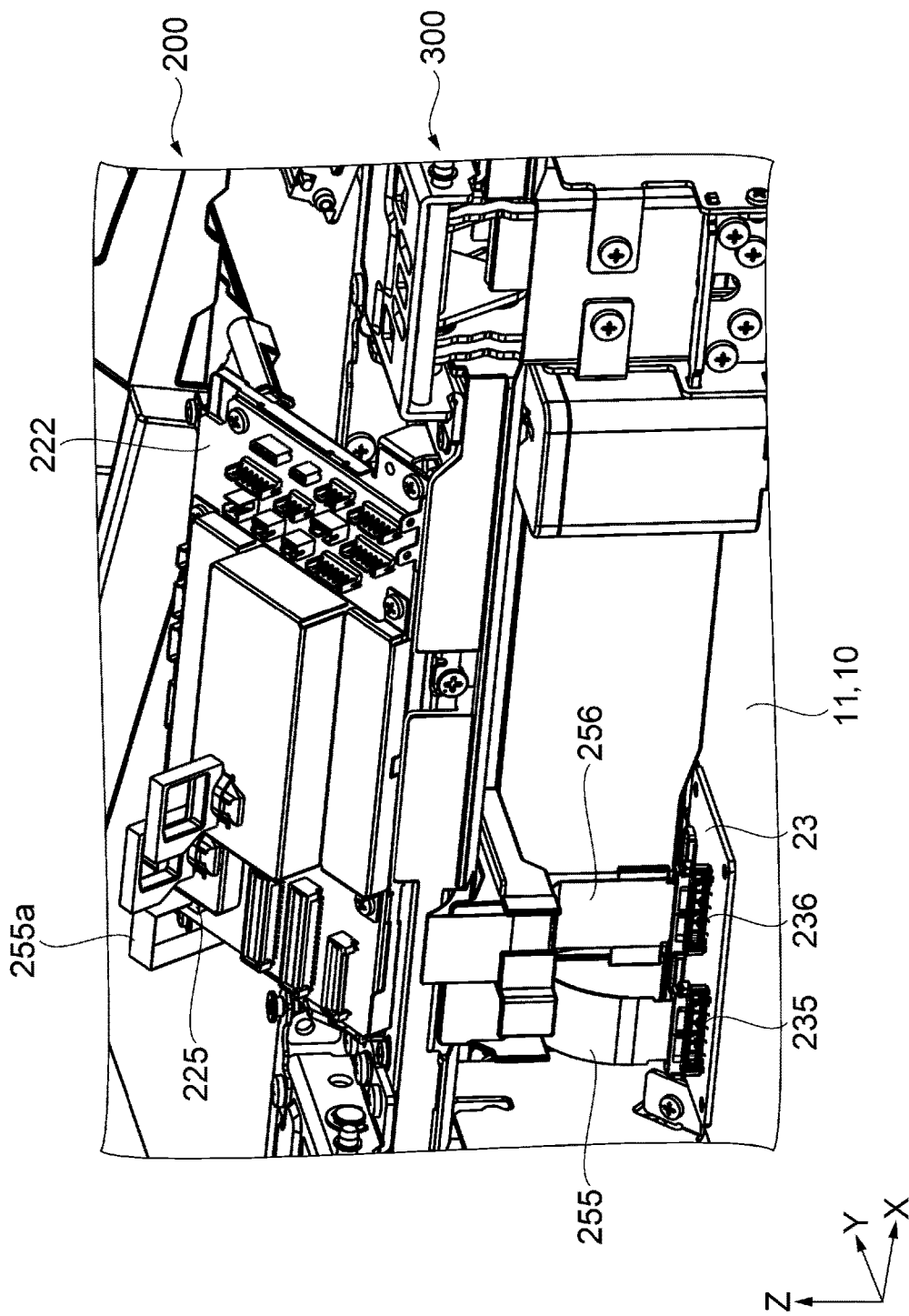
FIG. 6 is a magnified view of an area VI encircled by a dished line in FIG. 5.
Figure 7:
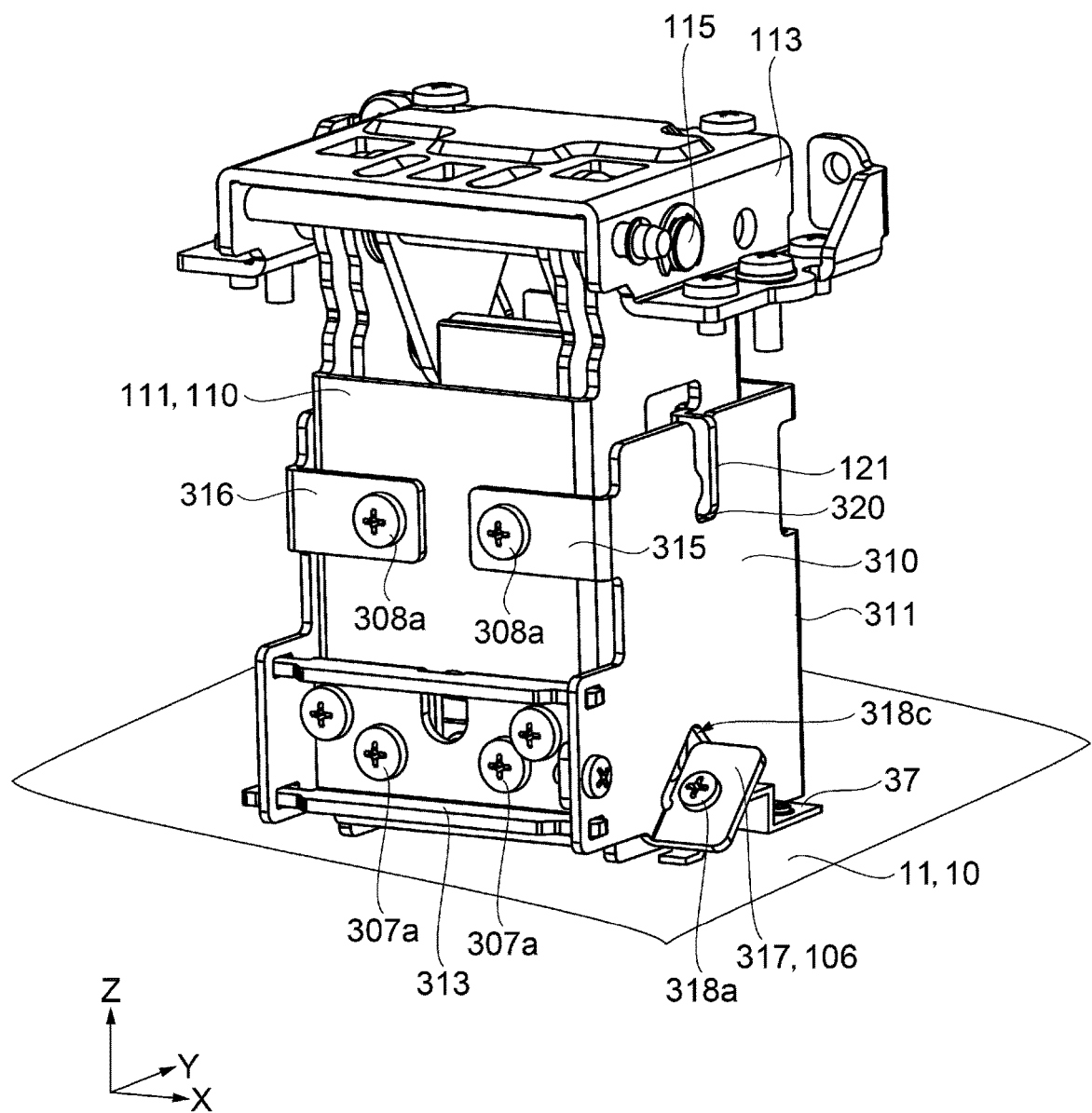
FIG. 7 is a magnified view of an area VII encircled by the other dished line in FIG. 5.
Figure 9:
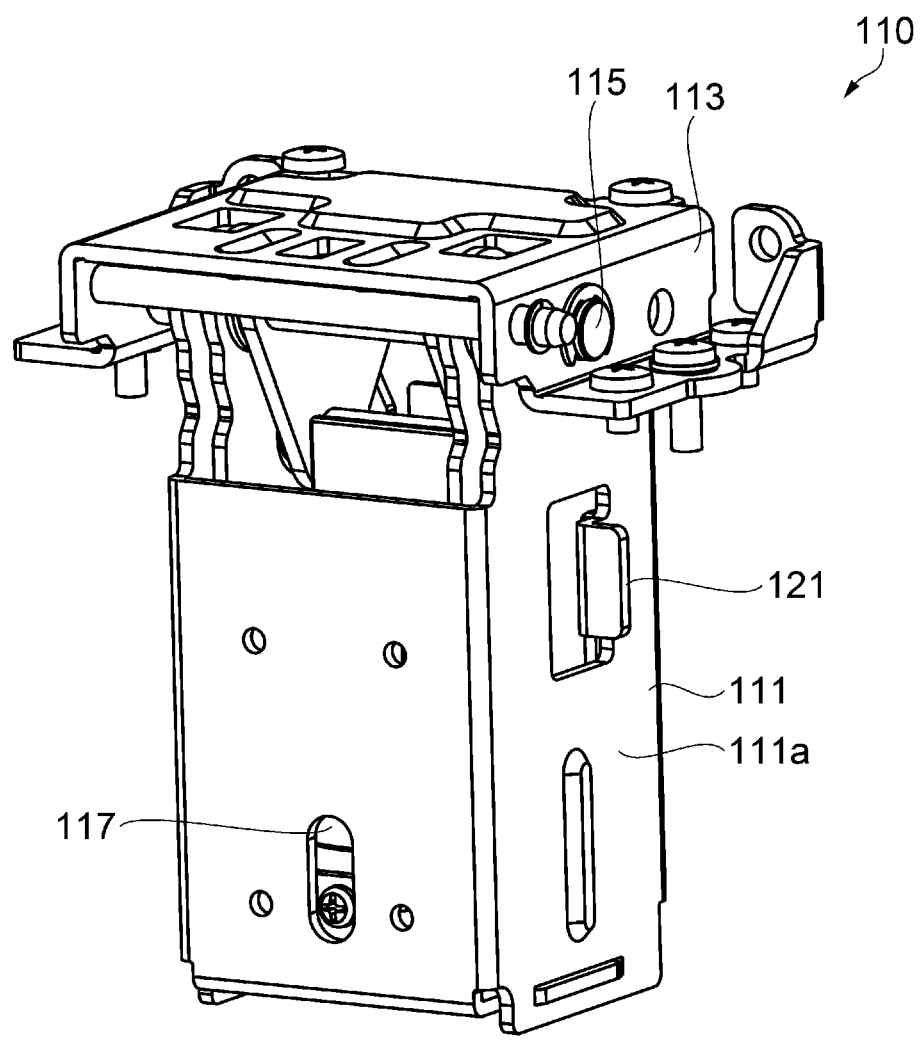
FIG. 9 is a perspective view of a hinge.

FIGS. 1 to 4 are perspective views of a printing system including a document reader according to the embodiment. FIG. 5 is a perspective view of the document reader according to the embodiment, and illustrates the document reader for the purpose of making the inside of the document reader easy to understand. FIG. 6 is a magnified view of an area VI encircled by a dished line in FIG. 5. FIG. 7 is a magnified view of an area VII encircled by the other dished line in FIG. 5. FIG. 8 is a perspective view of a fixing member. FIG. 9 is a perspective view of a hinge.

Figure 2:
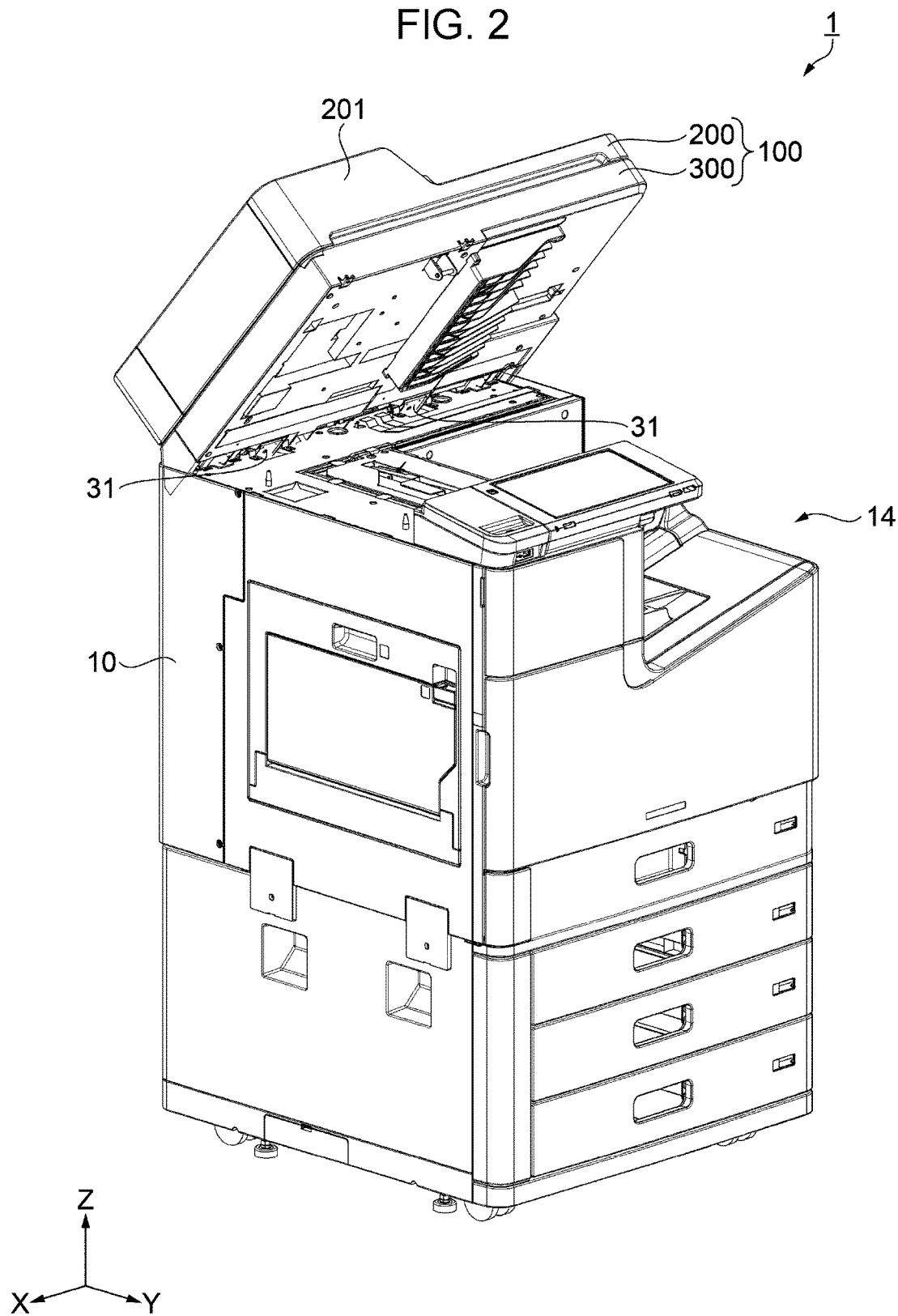
FIG. 2 is another perspective view of the printing system including the document reader according to the embodiment.

To put it specifically, FIG. 2 is a perspective view of the printing system 1 with the document reader 100 opened from a printer 10. FIG. 3 is a perspective view of the printing system 1 with an ADF 200 opened from a scanner unit 300. FIGS. 4 and 5 are perspective views of the printing system 1 in a direction opposite to the direction in which the printing system 1 is viewed in FIG. 1. Furthermore, FIG. 5 is the perspective view of the printing system 1 with back-side covers 21, 202, 302 detached from the printing system 1.

It should be noted that FIGS. 1 and 2 are the perspective views of the printing system 1 with the ADF 200 closed to the scanner unit 300, while FIG. 3 is the perspective views of the printing system 1 with the ADF 200 opened from the scanner unit 300.

In FIGS. 1 to 7, X, Y and Z axes are illustrated as three spatial axes orthogonal to one another. In an X axis direction along the X axis, a +X axis direction is a positive direction, while a −X axis direction is a negative direction. In a Y axis direction along the Y axis, a +Y axis direction is a positive direction, while a −Y axis direction is a negative direction. In a Z axis direction along the Z axis, a +Z axis direction is a positive direction, while a −Z axis direction is a negative direction. In other words, a direction pointed by an arrow head of each arrow symbol representing an axial direction is the +direction (positive direction), and a direction pointed from the arrow head to the arrow base end is the −direction (negative direction). Furthermore, an XY plane is a horizontal plane, and the −Z axis direction is the gravity direction. Moreover, the X, Y and Z axes in FIGS. 1 to 7 correspond to the X, Y and Z axes in the other drawings.

It should be noted that the Y axis direction is an example of an "apparatus front-rear direction." In addition, the +Z axis direction is an example of "upward," and will be referred to as upper in some cases. The −Z axis direction is an example of "downward," and will be referred to as downward or lower in some cases. Besides, the −Y axis direction is an example of "back-side."

As illustrated in FIG. 1, the printing system 1 is a multifunctional machine that has a printing function in addition to the document reading function. The printing system 1 includes: the document reader 100 arranged on its +Z axial side; and the printer 10 arranged on its −Z axial side. In other words, the printing system 1 has a configuration in which the document reader 100 is arranged on the printer 10 in this order.

It should be noted that the printer 10 is an example of a "structure under a document reading unit."

The printer 10 is an ink jet printer that records images such as characters and pictures on a sheet by ejecting ink onto the sheet. The printer 10 includes: a housing 11 serving as an external casing of the printer 10; an operation unit 12 arranged on an upper part (+Z axial side) of the housing 11; and sheet cassettes 13 provided in a lower part (−Z axial side) under a center portion of the printer 10. Four sheet cassettes 13 are arranged one on another in the −Z axis direction. Each sheet cassette 13 contains a stack of sheets. In addition, a delivery unit 14 onto which to deliver sheets each with images such as characters and pictures recorded thereon is provided in a part of the printer 10 that is above (to the +Z axial side from) the sheet cassettes 13, and that is to the right (to the −X axial side) from the operation unit 12. In other words, a space in which to provide the deliver unit 14 is provided in the upper right corner portion of the printer 10. Thus, a lower right corner portion of the document reader 100 is over the printer 10 with the space in which to provide the deliver unit 14 in between.

In the following descriptions, there are cases where: a side on which the operation unit 12 is arranged (the +Y axial side) will be referred to as a front; an opposite side from the front (the −Y axis direction) will be referred to as a back; and sides intersecting the front and the back (the +X axial side and the −X axial side) will be referred to as a lateral.

The document reader 100 includes: a sheet feeder tray 101 in which to set documents; the ADF 200 that transports documents along a predetermined transport path from the sheet feeder tray 101; the scanner unit 300 that scans images from each document transported from the ADF; and a delivery tray 102 onto which the document is delivered after the images are scanned from the document. The ADF 200 is arranged on the upper surface of the scanner unit 300, and includes therein a document transporter 205 that transports the document. A detachable front-side cover 201 is provided to the front of the ADF 200. An openable/closable lateral-side cover 231 is provided to a +X axial side of the ADF 200.

It should be noted that: the ADF 200 is an example of a "cover unit," while the scanner unit 300 is an example of a "document reading unit."

As illustrated in FIG. 2, connecting members 31 that openably and closably connect the printer 10 and the document reader 100 (the scanner unit 300) are provided on the back side of the printing system 1. The connecting members enable the document reader 100 to be opened from and closed to the printer 10. A recording head (not illustrated) that ejects ink onto a sheet is replaced with a new one while the document reader 100 is kept opened from the printer 10.

To put it specifically, the printer 10 includes therein the recording head that ejects ink onto a sheet. While the recording head is in use, ink flow paths in the recording head are clogged up. For this reason, the recording head needs to be returned to a normal condition by periodically carrying out maintenance processes such as flashing and wiping. Long-time use of the recording head, nevertheless, makes it difficult for the maintenance processes to return the recording head to the normal condition, and accordingly makes the recording head need to be replaced with a new one. The recording head replacement is carried out while the document reader 100 is kept opened from the printer 10.

As illustrated in FIG. 3, multiple hinges 110 that openably and closably connect the ADF 200 to the scanner unit 300 are arranged on the back side of the document reader 100. To put it specifically, the scanner unit 300 includes a mount table 373 on which to mount documents, and the multiple hinges 110 that openably and closably connect the ADF 200 to the mount table 373 are arranged there. The number of hinges 110 is two. The two hinges 110 are arranged in the X axis direction. Thus, the ADF 200 is openable from and closable to the mount table 373 as the ADF 200 turns around a turn shaft 115 of each hinge 110 (see FIG. 9). Specifically, the hinge 110 connects the scanner unit 300 and the ADF 200 in a way that the ADF 200 is openable from and closable to the scanner unit 300 as the ADF 200 turns around the turn shaft 115.

In other words, the provision of the hinge 110 enables the ADF 200 to be arranged on the upper surface of the scanner unit 300 to cover the scanner unit 300, and makes the ADF 200 movable between a state of being open from the mount table 373 (an open state) and a state of being closed to the mount table 373 (a closed state).

The state where the ADF 200 is open from the mount table 373 will be hereinafter referred to as an open state, while the state where the ADF 200 is closed to the mount table 373 will be hereinafter referred to as a closed state.

The scanner unit 300 is provided with the mount table 373 on which to mount documents in the +Z axis direction. In other words, the scanner unit 300 includes the mount table 373 that reads documents mounted on the mount table 373. The mount table 373 includes a resin-made external member 380, and platen glasses 374, 375. Furthermore, an image reading unit (not illustrated) is arranged under the platen glasses 374, 375.

The external member 380 includes: an opening 371 that is longer in the Y axis direction; and an opening 372 that is arranged to the −X axial side from the opening 371, and that is longer in the X axis direction. The platen glass 374 is arranged inside the external member 380, and covers the opening 371. The platen glass 375 is arranged inside the external member 380, and covers the opening 372.

When the image reading unit reads images on a document transported by the ADF 200, the image reading unit stops under the platen glass 374. In the closed state, the image reading unit reads the images on the document transported from the ADF 200 with the platen glass 374 in between.

It should be noted that when the image reading unit reads the images on the document transported by the ADF 200, a reading window for reading the images on the document is formed from the platen glass 374 and the opening 371 of the external member 380. In other words, the scanner unit 300 includes the reading window that reads the images on the document transported from the ADF 200, and that is formed from the platen glass 374 and the opening 371. The ADF 200 includes the document transporter 205 (see FIG. 1) that transports the document to the reading window formed from the platen glass 374 and the opening 371. In the closed state, this configuration makes it possible for the document reader 100 to read the images on the document transported from the document transporter 205 with the platen glass 374 interposed in between.

The reading of images on a document without using the ADF 200 is achieved by: mounting the document inside the opening 372 after the open state is established; and thereafter moving the image reading unit in the −X axis direction after the closed state is established.

To put it specifically, the document is mounted inside the opening 372 with the document touching ends of the opening 372, and where to mount the document is determined (controlled) by the opening 372 of the external member 380. A document mat 203 is provided to a scanner unit 300-facing side of the ADF 200. Once the ADF 200 is closed to the mount table 373, the document mounted on the mount table 373 (the platen glass 375) is pressed by the document mat 203, and the read surface of the document thus comes into close contact with the platen glass 375. Thereafter, while the document mat 203 is pressing and keeping the document in close contact with the platen glass 375, the image reading unit is moved in the −X axis direction. Thereby, the image reading unit reads the images on the document.

In other words, the mount table 373 includes the opening 372 that is an example of a "first recessed portion" in which to place the document. The ADF 200 includes the document mat 203 that is an example of a "document cover unit," and that is arranged to internally contact the opening 372 in the closed state. The document reader 100 reads the images on the document by moving the image reading unit in the −X axis direction with the document pressed by the document mat 203 to be in closed contact with the platen glass 375 in the closed state.

As illustrated in FIG. 4, the back-side cover 21 is provided to the back side of the printer 10. The back-side cover 21 is openable and closable as the back-side cover 21 pivots around a −X axial side end 15 of the housing 11. As indicated with dashed lines in FIG. 4, a control circuit 22 that controls the entirety of the printing system 1 is provided on the back side of the printer 10. Once the back-side cover 21 is opened, the control circuit 22 is exposed to the outside.

Moreover, the back-side cover 202 is provided to the back side of the ADF 200, while the back-side cover 302 is provided to the back side of the scanner unit 300. The back-side covers 202, 302 are detachable.

As illustrated in FIGS. 5 and 6, the two hinges 110 that allow the ADF 200 to move to the open state or the closed state are arranged in the X axis direction on the back side of the ADF 200. A control circuit 222 that controls the ADF 200 is provided between the two hinges 110. In addition, a relay board 23 is provided under the control circuit 222. The relay board 23 is fixed to the housing 11 of the printer 10.

The relay board 23 is provided between the control circuit 22 (see FIG. 4) of the printer 10 and the control circuit 222 of the ADF 200. The relay board 23 is arranged at a position that is closer to the control circuit 222 of the ADF 200 than the control circuit 22 of the printer 10.

Signals can be sent and received between the control circuit 22 of the printer 10 and the control circuit 222 of the ADF 200 via flexible flat cables (hereinafter abbreviated to as FFCs) 255, 256. The control circuit 222 controls the ADF 200 based on a signal supplied from the control circuit 22 of the printer 10.

For example, each time the recording head of the printer 10 is replaced with a new one, the FFCs that electrically connect the control circuit 22 and the control circuit 222 needs to be attached to and detached from the connectors of the control circuit 22 and the control circuit 222.

To put it specifically, before the recording head replacement, the FFCs needs to be detached from the connectors of the control circuit 22 and the control circuit 222, and thereafter, the document reader 100 needs to be put into a state of being open from the printer 10 (the state illustrated in FIG. 2). After the recording head replacement, the FFCs need to be attached to the connectors of the control circuit 22 and the control circuit 222, and thereafter, the document reader 100 needs to be put into a state of being closed to the printer 10 (the state illustrated in FIG. 1).

However, each time the FFCs are detached from the connectors, there is a risk that: the detachment deforms the FFCs; the deformation applies mechanical stress to the FFCs; and the mechanical stress causes problems such as breaking of wires in the FFCs. If a problem takes place in a FFC, the FFC in which the problem takes place needs to be detached from the control circuit 22 and the control circuit 222 to attach a new FFC to the control circuit 22 and the control circuit 222.

The control circuit 22 and the control circuit 222 are a distance away from each other. In addition, various members are arranged between the control circuit 22 and the control circuit 222. For these reason, if the control circuit 22 and the control circuit 222 were connected together using a single FFC, the connection would raise a risk that: the layout of the FFC becomes complicated; it takes time and skill to attach and detach the FFC; and the attachment and detachment of the FFC cause a new problem on a different component.

In this embodiment, the relay board 23 is provided between the control circuit 22 of the printer 10 and the control circuit 222 of the ADF 200.

The relay board 23 is provided with a connector 236 to which to connect the FFC 256, and the control circuit 22 of the printer 10 is provided with a connector (not illustrated) to which to connect the FFC 256. The FFC 256 electrically connects the relay board 23 and the control circuit 22 of the printer 10.

In addition, the relay board 23 is provided with a connector 235 to which to connect the FFC 255, and the control circuit 222 of the ADF 200 is provided with a connector 225 to which to connect the FFC 255. To put it specifically, the control circuit 222 of the ADF 200 is provided with the connector 225 to which to connect a partially branched FFC 255*a*. The FFC 255 electrically connects the relay board 23 and the control circuit 222 of the ADF 200.

In other words, the FFCs 255, 256 electrically connect the control circuit 22 of the printer 10 and the control circuit 222 of the ADF 200 via the relay board 23. Because the relay board 23 is arranged near the control circuit 222, the length of the FFC 255 that connects the relay board 23 and the control circuit 222 of the ADF 200 is shorter than the length of the FFC 256 that connects the relay board 23 and the control circuit 22 of the printer 10.

Because of this configuration, the recording head replacement the requires only the FFC 255 that connects the control circuit 222 of the ADF 200 and the relay board 23 to be detached from the control circuit 222 and the relay board 23 after the document reader 100 is put into the state of being open from the printer 10, and to be attached to the control circuit 222 and the relay board 23 before the document reader 100 is put into the state of being closed to the printer 10. The FFC 256 that connects the control circuit 22 of the printer 10 and the relay board 23 need not be detached or attached. Thus, mechanical stress is likely to be applied to the FFC 255 that connects the control circuit 222 of the ADF 200 and the relay board 23, and a problem is likely to take place in the FFC 255. Meanwhile, mechanical stress is less likely to be applied to the FFC 256 that connects the control circuit 22 of the printer 10 and the relay board 23, and a problem is less likely to take place in the FFC 256.

Furthermore, the length of the FFC 255 that connects the control circuit 222 of the ADF 200 and the relay board 23 is shorter than the length of the FFC 256 that connects the control circuit 22 of the printer 10 and the relay board 23. In addition, the number of obstacles (other members) that make it difficult to install the FFC 255 therein is smaller between the control circuit 222 of the ADF 200 and the relay board 23 than between the control circuit 22 of the printer 10 and the relay board 23. These make it easy to handle the FFC 255. Accordingly, the FFC 255 that connects the control circuit 222 of the ADF 200 and the relay board 23 can be replaced more easily than the FFC 256 that connects the control circuit 22 of the printer 10 and the relay board 23.

As discussed above, this embodiment has the configuration that makes it easy to replace the FFC 255 since the relay board 23 arranged near the control circuit 222 of the ADF 200 is provided to the printer 10. For this reason, even in a case where a problem takes place in the FFC 255 as a result of the replacement of the recording head, the FFC 255 can be replaced more easily that the FFC 256, and stop loss to be caused by the replacement of the FCC 255 can be accordingly minimized.

Moreover, on the back side of the ADF 200, the control circuit 222 of the ADF 200 is arranged inclining in a way that makes the control circuit 222 intersect the XY plane (the horizontal plane). In other words, the control circuit 222 is arranged obliquely. The oblique arrangement of the control circuit 222 makes it possible to make a Y axial dimension (a depth-direction dimension) of the control circuit 222 on the plan view from the Z axis direction shorter than if the control circuit 222 were horizontally arranged on the XY plane.

The state of intersecting the XY plane (the horizontal plane) will be hereinafter referred to as oblique or inclined.

What is more, the oblique arrangement of the control circuit 222 results in the oblique arrangement of the connector 225 to which to connect the FFC 255, and accordingly makes it easier to attach and detach the FCC 255 than if the control circuit 222 and the connector 225 were horizontally arranged.

To put it specifically, the horizontal arrangement of the control circuit 222 would results in the horizontal arrangement of the connector 225 to which to connect the FFC 255, and would make the FFC 255 need to be attached to or detached from the connector 225 by moving the FFC 255 over the control circuit 222 in the horizontal direction. However, other members (for examples, wires and the like) arranged over the control circuit 222 are likely to make it difficult for the FFC 255 to move over the control circuit 222 in the horizontal direction. On the other hand, the oblique arrangement of the connector 225 to which to connect the FFC 255 makes the FFC 255 less likely to be influenced by other members arranged over the control circuit 222, and accordingly makes it easier to attach and detach the FFC 255.

Besides, it is conceivable that the control circuit 222 is arranged orthogonal to the XY plane (the horizontal plane). The orthogonal arrangement of the control circuit 222 relative to the horizontal plane, however, makes the control circuit 222 likely to be influenced by force working in the horizontal direction. For example, there is likelihood that: force in the horizontal direction works on the control circuit 222; the force in the horizontal direction deforms a member that fixes the control circuit 222; and the orientation of the control circuit 222 is changed.

For these reasons, it is desirable that the control circuit 222 be arranged obliquely in order to make the orientation of the control circuit 222 stable, and in order to make it easier to attach and detach the FFC 255.

As illustrated in FIGS. 7 and 8, a fixing member 310 that fixes the hinge 110 to the scanner unit 300 is attached on the back side of the scanner unit 300. The fixing member 310 is a columnar member that has a square bottom surface (not illustrated) on the plan view from the Z axis direction, and its inside is hollow.

The fixing member 310 includes: a lateral wall 311 located on its +X axial side; a lateral wall 312 located on its −X axial side; a back-side wall 313 located on its −Y axial side; and a front-side wall 314 located on its +Y axial side. In other words, the fixing member 310 is a hollow member surrounded by the lateral wall 311, the lateral wall 312, the back-side wall 313 and the front-side wall 314.

Furthermore, cuts (slits) 320 that are an example of an "engaged portion" are provided in upper parts of the lateral walls 311, 312, respectively.

The back-side wall 313 is a rectangular member that connects the lateral wall 311 and the lateral wall 312, and that is longer in the X axis direction. The back-side wall 313 is made from a material different from a material from which the lateral walls 311, 312 and the front-side wall 314 are made. The back-side wall 313 is provided with two screw holes 307. Adjusting screws 307a that are an example of a "pressing portion" are screwed into the screw holes 307. The adjusting screws 307a press a case 111 of the hinge 110.

Furthermore, a wall 315 formed by bending the lateral wall 311, and a wall 316 formed by bending the lateral wall 312 are provided to an upper side of the back-side wall 313. Like the back-side wall 313, the walls 315, 316 are arranged in the X axis direction. The walls 315, 316 are provided with screw holes 308, respectively. Fixing screws 308a are screwed into the screw holes 308.

Moreover, an inclined wall 317 inclined obliquely and formed by bending the lateral wall 311 is provided. The inclined wall 317 is provided projecting from the lateral wall 311 in the +X axis direction. A slit 318c is provided between the lateral wall 311 and the inclined wall 317. The inclined wall 317 is provided with a screw hole 318 that allows a screw 318a to be screwed into the screw hole 318.

Similarly, an inclined wall (not illustrated) formed by bending the lateral wall 312 is formed projecting from the lateral wall 312 in the −X axis direction. This inclined wall has the same structure as the inclined wall 317, and allows the other screw 318a to be screwed into the inclined wall.

A fixing member 37 is attached to the housing 11 of the printer 10. The fixing member 37 is fixed to the housing 11 of the printer 10 using screws, and is replaceable. The fixing member 37 and the inclined wall 317 are fixed using the screw 318a. Similarly, the fixing member 37 and the inclined wall formed by bending the lateral wall 312 are fixed with the other screw 318a.

The fixing member 37 is a member provided to the printer 10. The inclined wall 317 is a member provided to the document reader 100 (the scanner unit 300). The printer 10 and the document reader 100 are fixed together using the fixing member 37, the inclined wall 317 and the screw 318a.

As discussed above, the printer 10 and the document reader 100 are connected together using the connecting members 31 in a way that the document reader 100 is openable from and closable to the printer 10. If the printer 10 and the document reader 100 were connected together using the connecting members 31 alone, the fixing of the document reader 100 to the printer 10 would be insufficient, and the stability of the orientation of the document reader 100 would become worse when, for example, the document reader 100 vibrates. With this taken into consideration, the fixing member 37 and the inclined wall 317 (the fixing member 310) are fixed together using the screw 318a in order to secure the stability of the orientation of the document reader 100. In other words, the printer 10 and the document reader 100 are connected (fixed) together using the fixing members 310 in addition to the connecting members 31.

Both the inclined wall 317 and the screw hole 318 are inclined. For the same reason as the control circuit 222 is obliquely arranged, the screw 318a can be screwed into the screw hole 318 more easily than if the inclined wall 317 would not be inclined.

The component replacement for the printer 10 (the replacement of the recording head) and the repair of the printer 10 are carried out while the document reader 100 is kept open from the printer 10 (in the state illustrated in FIG. 2). The screw 318a that fixes the fixing member 37 and the inclined wall 318 together needs to be detached from them in order to open the document reader 100 from the printer 10.

If, however, the document reader 100 would be tried to be opened from the printer 10 without detaching the screw 318a that fixes the fixing member 37 and the inclined wall 317 together, unwanted force would work on the fixing member 37 and the inclined wall 317.

In this embodiment, since the slit 318c is provided between the lateral wall 311 and the inclined wall 317, the mechanical strength of the inclined wall 317 is weak. For this reason, the inclined member 317 is deformed by unwanted force if the unwanted force would work on the fixing member 37 and the inclined wall 317. Furthermore, even if the inclined member 317 is deformed by unwanted force, the deformed inclined member 317 can be restored to the appropriate condition using a pair of pliers.

Furthermore, in a case where unwanted force working on the fixing member 37 and the inclined wall 317 is strong, there is likelihood that, in addition to the deformation of the inclined member 317, the fixing member 37 becomes deformed. Even if the fixing member 37 would be deformed by the unwanted force, the fixing member 37 can be restored to the appropriate condition by replacing the deformed fixing member 37 with a new one 37.

In sum, even if unwanted force working on the fixing member 37 and the inclined wall 317 is strong, it is possible to inhibit damage on the fixing member 37, and resultant damage on the main body (the housing 11) of the printer 10.

As discussed above, even in the case where the opening of the document reader 100 from the printer 10 without detaching the screw 318a that fixes the fixing member 37 and the inclined wall 317 causes a problem on the fixing member 37 of the printer 10, the problem can be easily corrected by replacing the fixing member 37 with a new one 37. Thus, it is possible to prevent the occurrence of a difficult-to-correct fatal damage on the printing system 1.

As illustrated in FIGS. 7 and 9, each hinge 110 includes the case 111, an attachment member 113, the turn shaft 115, and a pressing member 117. The pressing member 117 is made from an elastic material, and is contained in the case 111. The pressing member 117 is a member that holds the ADF 200 open, although later discussed in detail. The attachment member 113 is a member that fixes the ADF 200 to the hinge 110. The ADF 200 is fixed to the attachment member 113. The case 111 is arranged to the −Z axial side from the attachment member 113. The attachment member 113 is turnably connected to the case 111 with the assistance of the turn shaft 115.

The hinge 110 is arranged on the back side of the scanner unit 300 in a way that a pressing direction of the pressing member 117 coincides with the direction (the Z axis direction) in which the scanner unit 300 and the ADF 200 cover each other. Furthermore, the hinge 110 is arranged on the back side of the scanner unit 300 in a way that the turn shaft 115 is located above the pressing member 117.

The hinges 110 connect the scanner unit 300 and the ADF 200 such that the ADF 200 is openable from and closable to the scanner unit 300 as the ADF 200 turns around the turn shaft 115.

The ADF 200 includes therein the document transporter 205 (including, for example, a motor, a cam, a belt, a shaft and the like) that transports documents, and is accordingly heavier than if the ADF 200 included no document transporter 205. As illustrated in FIG. 3, in the open state, the weight of the ADF 200 makes a moment F1, trying to put the ADF 200 into the closed state, work on the ADF 200. Meanwhile, the pressing member 117 presses a moment F2, countering the moment F1 that tries to put the ADF 200 into the closed state, against the ADF 200.

The moment F1 will be hereinafter referred to as a force F1, while the moment F2 will be hereinafter referred to as a drag F2.

As discussed above, the force F1 that tries to put the ADF 200 into the closed state and the drag F2 that tries to put the ADF 200 into the open state work on the ADF 200.

The pressing member 117 is made from an elastic material, and is deformed depending on the force F1. For example, as the force F1 becomes larger, the deformation of the pressing member 117 becomes larger, and the drag F2 becomes larger. As the force F1 becomes smaller, the deformation of the pressing member 117 becomes smaller, and the drag F2 becomes smaller. In this way, since the pressing member 117 is formed from an elastic material, the drag F2 changes in proportion to a changed in the force F1.

In this embodiment, the pressing member 117 is provided in order to make it possible to hold the orientation of the ADF 200 at a predetermined position within an open-close range of the ADF 200. For this reason, the force F1 that tries to put the ADF 200 into the closed state is equal to the drag F2 that tries to put the ADF 200 into the open state, and the orientation of the ADF 200 is accordingly held in the open state at the predetermined position within the open-close range of the ADF 200.

Since the force F1 and the drag F2 balance out at the predetermined position within the open-close range of the ADF 200, the ADF 200 can be opened and closed when a new weak force is added to the ADF 200. Thus, the ADF 200 can be easily opened from and closed to the scanner unit 300.

In addition, inside the case 111, the pressing direction of the pressing force of the pressing member 117 coincides with the direction (the Z axis direction) in which the scanner unit 300 and the ADF 200 cover each other.

The case 111 of the hinge 110 is contained in the fixing member 310 of the scanner unit 300, and is fixed to the fixing member 310 using the fixing screws 308a that are inserted in the screw holes 308 provided to the walls 315, 316. Specifically, the case 111 of the hinge 110 and the fixing member 310 of the scanner unit 300 are fixed together using the fixing screws 308a. In other words, the ADF 200 and the scanner unit 300 are fixed together using the fixing screws 308a.

The case 111 is located under the turn shaft 115, and includes a surface 111a that intersects the axial direction of the turn shaft 115 (the X axis direction). The surface 111a is arranged on the +X axial side. The case 111 further includes a surface (not illustrated) arranged on its −X axial side, and facing the surface 111a. The surface 111a and the surface arranged facing the surface 111a are provided respectively with projecting portions 121 that are an example of an "engaging portion." Each projecting portion 121 is formed by folding a part of the case 111, and projects out from the case 111. Moreover, the projecting portions 121 are engaged with the slits 320 that are provided to the lateral walls 311, 312 of the fixing member 310, and the distal ends of the projecting portions 121 project out from the fixing member 310.

As discussed above, the projecting portions 121 are formed on the case 111 that houses the pressing member 117.

Figure 10:
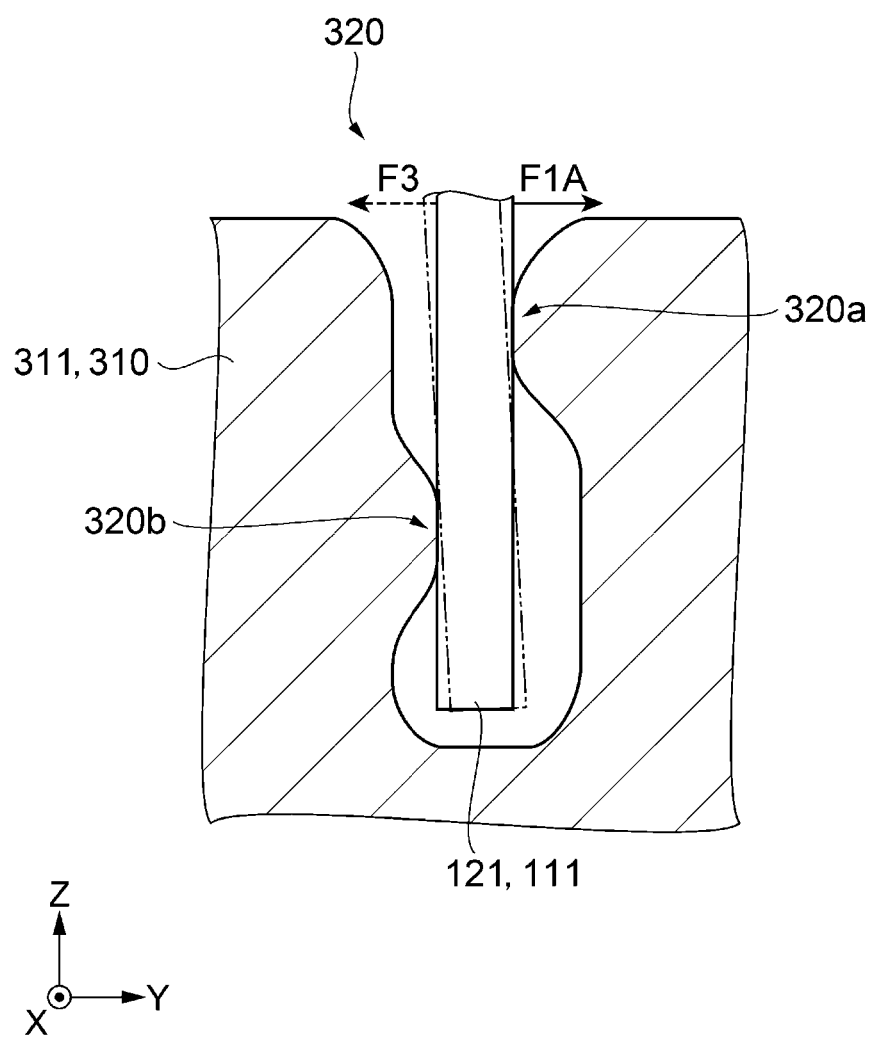
FIG. 10 is a schematic plan view illustrating how a projecting portion is engaged with a slit.

FIG. 10 is a schematic plan view illustrating how one projecting portion is engaged with the corresponding slit. FIG. 10 is also a schematic plan view of the surface 111a of the case 111 from the X axis direction.

In FIG. 3, the force F1 that tries to put the ADF 200 into the closed state can be divided into a component force F1A in the +Y axis direction, and a component force in the −Z axis direction. In FIG. 10, the component force F1A is indicated with a solid-line arrow.

As illustrated in FIG. 10, the slit 320 includes: an upper projecting portion 320a that is provided to an upper side of the lateral wall 311, and that is located on the +Y axial side of the slit 320; and a lower projecting portion 320b that is provided to a lower side of the lateral wall 311, and that is located on the −Y axial side of the slit 320.

On a plan view from the X axis direction, the projecting portion 121 of the case 111 is arranged inside the slit 320 of the fixing member 310, and between the upper projecting portion 320a and the lower projecting portion 320b. Once the force F1 works on the ADF 200, the component force F1A works on the hinge 110 (the projecting portion 121) to which the ADF 200 is fixed.

The component force F1A (the force in the +Y axis direction) works on the +Z axial side (the upper side) of the projecting portion 121. Once the component force F1A works on the +Z axial side of the projecting portion 121, the projecting portion 121 tries to pivot around its part where the projecting portion 121 and the upper projecting portion 320a are in contact with each other. Thus, a force in a direction opposite to the direction of the component force F1A (a force in the −Y axis direction) works on the −Z axial side (the lower side) of the projecting portion 121.

The upper projecting portion 320a inhibits the movement of the +Z axial side of the projecting portion 121 lest the +Z axial side of the projecting portion 121 be moved by the component force F1A (the force in the +Y axis direction). The lower projecting portion 320b inhibits the movement of the −Z axial side of the projecting portion 121 lest the −Z axial side of the projecting portion 121 be moved by the force in the direction opposite to the direction of the component force F1A (the force in the −Y axis direction).

As discussed above, when the force F1 works on the hinge 110, the upper projecting portion 320a and the lower projecting portion 320b restrict the influence of the component force F1A lest the position of the projecting portion 121 (the hinge 110) be changed by the component force F1A.

The production of the document reader 100 and the maintenance or repair of the document reader 100 involve work of assembling the ADF 200 with the scanner unit 300, and work of disassembling the ADF 200 from the scanner unit 300 and thereafter assembling the ADF 200 with the scanner unit 300. During this work of assembling the ADF 200 with the scanner unit 300, the weight of the ADF 200 makes the force F1 work on the ADF 200, and accordingly makes the component force F1A work on the hinge 110.

When the ADF 200 is assembled with the scanner unit 300 with the projecting portion 121 of the hinge 110 kept engaged with the slit 320 of the fixing member 310, the upper projecting portion 320a and the lower projecting portion 320b act lest the position of the hinge 110 be moved by the component force F1A. This inhibits the influence of the component force F1A on the hinge 110 (the influence of the force F1 on the ADF 200), and thus makes it easy to assemble the ADF 200 with the scanner unit 300 appropriately.

If a force F3 indicated with a dashed-line arrow in FIG. 10 works on the +Z axial side of the projecting portion 121, Specifically, if the force F3 in the −Y axis direction works on the +Z axial side of the projecting portion 121, the projecting portion 121 moves away from the upper projecting portion 320a while remaining in contact with the lower projecting portion 320b, as indicated with chain double-dashed lines in FIG. 10. Specifically, the projecting portion 121 pivots around its part where the projecting portion 121 is in contact with the lower projecting portion 320b in a way that: the −Z axial side of the projecting portion 121 moves in the +Y axis direction; and the +Z axial side of the projecting portion 121 moves in the −Y axis direction.

As discussed above, once the force F3 in the −Y axis direction works on the +Z axial side of the projecting portion 121 with the projecting portion 121 of the hinge 110 kept engaged with the slit 320 of the fixing member 310, the projecting portion 121 pivots counterclockwise around its part where the projecting portion 121 is in contact with the lower projecting portion 320b.

The document reader 100 is produced as follows. The ADF 200 and the scanner unit 300 are assembled independently. After that, the hinges 110 are attached to the ADF 200, while the fixing members 310 are attached to the scanner unit 300. Subsequently, the hinges 110 attached to the ADF 200 are fitted into the fixing members 310 attached to the scanner unit 300, and the projecting portions 121 of the hinges 110 are engaged with the slits 320 of the fixing members 310. Thereby, the ADF 200 is assembled with the scanner unit 300 while inhibiting the movement of the hinges 110 in the +Y axis direction even though the weight of the ADF 200 makes the force F1 work on the ADF 200.

Thereafter, in each fixing member 310, the adjusting screws 307a are respectively screwed into the two screw holes 307 provided to the back-side wall 313. Since the adjusting screws 307a (the screw holes 307) are arranged to the −Z axial side from the projecting portions 121 and the slits 320, the distal ends of the adjusting screws 307a press the −Z axial side of the case 111 of the hinge 110. In other words, the projecting portions 121 are formed on the case 111 that houses the pressing member 117, and the adjusting screws 307a press the −Z axial side of the hinge 110 (the case 111) from the back side of the scanner unit 300. Thereby, the force in the +Y axis direct works on the −Z axial side of the case 111.

While each projecting portion 121 is engaged with the corresponding slit 320, the projecting portion 121 can pivot counterclockwise around its part where the projecting portion 121 is in contact with the lower projecting portion 320b. For this reason, once the force in the +Y axis direction works on the −Z axial side of the case 111, the projecting portion 121 pivots counterclockwise around the its part where the projecting portion 121 is in contact with the lower projecting portion 320b. This changes the Y axial position of the +Z axial side of the hinge 110.

Thus, the Y axial position of the −Z axial side of the hinge 110 (the ADF 200) can be adjusted (tuned) by screwing the adjusting screws 307a into the screw holes 307. Specifically, the ADF 200 can be appropriately positioned relative to the scanner unit 300.

Thereafter, the Y axial position of the −Z axial side of the hinge 110 is adjusted to match the target position, and the ADF 200 is appropriately positioned relative to the scanner unit 300. Then, the ADF 200 and the scanner unit 300 are fixed together by screwing the fixing screws 308a into the screw holes 308 provided to the walls 315, 316.

As discussed above, when the document reader 100 is produced, the ADF 200 can be assembled with the scanner unit 300 with high precision by: fitting the hinges 110 attached to the ADF 200 into the fixing members 310 of the scanner unit 300; adjusting the Y axial position of the ADF 200 relative to the scanner unit 300 using the projection portions 121, the slits 320 and the adjusting screws 307a; and thereafter fixing the ADF 200 and the scanner unit 300 together using the fixing screws 308a.

As described above, the "positioning mechanism" in this application includes: the projecting portions 121 (the engaging portions) located below the turn shaft 115, and formed respectively on the surface 111a intersecting the axial direction of the turn shaft 115 of the hinge 110 (the X axis direction), and the surface facing the surface 111a; the slits 320 (the engaged portions) formed in the scanner unit 300, and engaged with the projecting portions 121; and the adjusting screws 307a that are located below the positions of the projecting portions 121 and the slits 320, and that press the hinge 110 from the back side of the scanner unit 300. In addition, the above-discussed positioning mechanism adjusts the Y axial positions of the scanner unit 300 and the hinges 110 (the ADF 200) using: the engagement of the projecting portions 121 with the slits 320; and the adjusting screws 307a.

In this embodiment, the multiple (two) hinges 110 are arranged. The above-discussed positioning mechanism can be used to adjust the Y axial positions of the scanner 300 and each hinge 110. Thus, the ADF 200 can be assembled with the scanner unit 300 with high precision.

Figure 11:
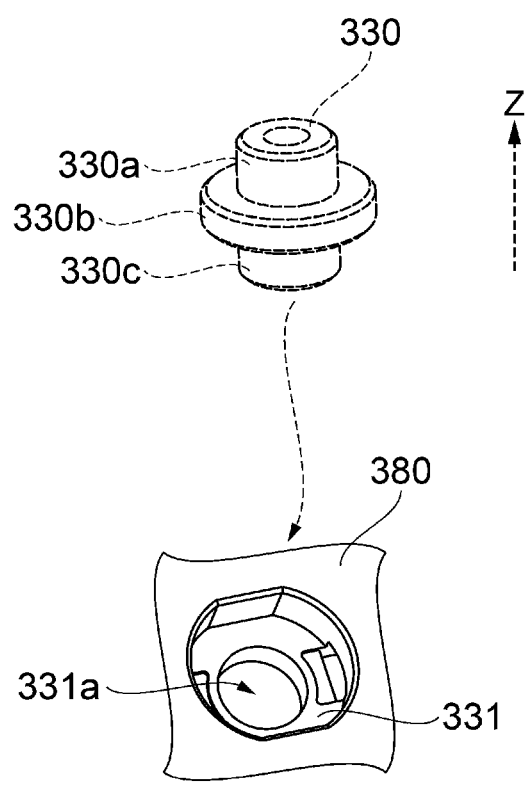
FIG. 11 is a schematic view illustrating how a recessed portion is provided to an external member of a scanner unit.
Figure 12:
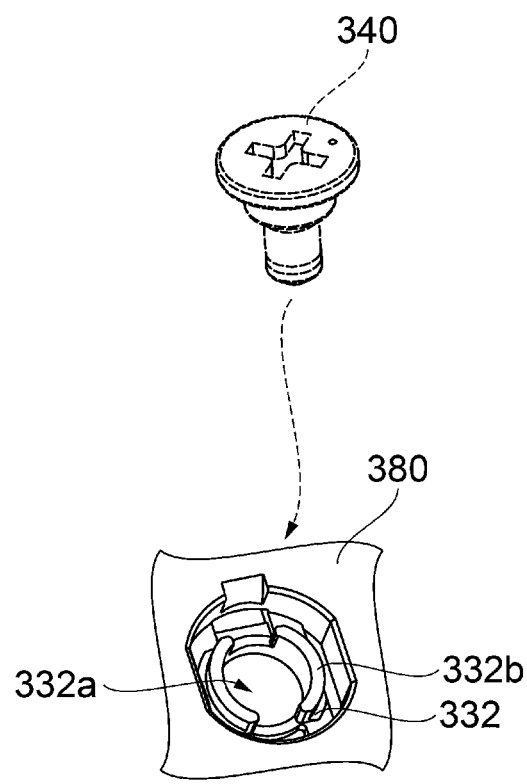
FIG. 12 is the other schematic view illustrating how the recessed portion is provided to the external member of the scanner unit.

FIGS. 11 and 12 are schematic views illustrating how a recessed portion is provided to the external member of the scanner unit.

In addition to the above-discussed positioning mechanism, this embodiment includes a configuration that makes it possible to adjust the position of the ADF 200 relative to the scanner unit 300 during the work of assembling the ADF 200 with the scanner unit 300. The details of the configuration will be described by referring to FIGS. 3, 11 and 12.

As illustrated in FIG. 3, the external member 380 of the scanner unit 300 is provided with a recessed portion 331, and a recessed portion 332 that is an example of a "third recessed portion." The recessed portion 331 is provided to a −Y axial end portion of the external member 380 of the scanner unit 300, and is located to the −Y axial side from the platen glass 374. The recessed portion 332 is provided to a +Y axial side and +X axial end portion of the external member 380 of the ADF 200, and is located to the +X axial side from the platen glass 374.

An external member 380 (scanner unit 300)-facing surface of the ADF 200 is provided with a recessed portion 341, and a recessed portion 342 that is an example of a "second recessed portion." Specifically, the recessed portions 341, 342 are formed on a free end side (a +Y axial side) of the ADF 200 at least away from the turn shafts 115 of the hinges 110. The recessed portions 341, 342 are through-holes provided to the housing of the ADF 200. In the closed state, on the plan view from the Z axis direction, the recessed portion 341 coincides with the recessed portion 331, and the recessed portion 342 coincides with the recessed portion 332. In other words, in the closed state, on the plan view from the Z axis direction, the recessed portion 341 is formed in a way that the recessed portion 341 coincides with the recessed portion 331, and the recessed portion 342 is formed in a way that the recessed portion 342 coincides with the recessed portion 332.

Figure 13:
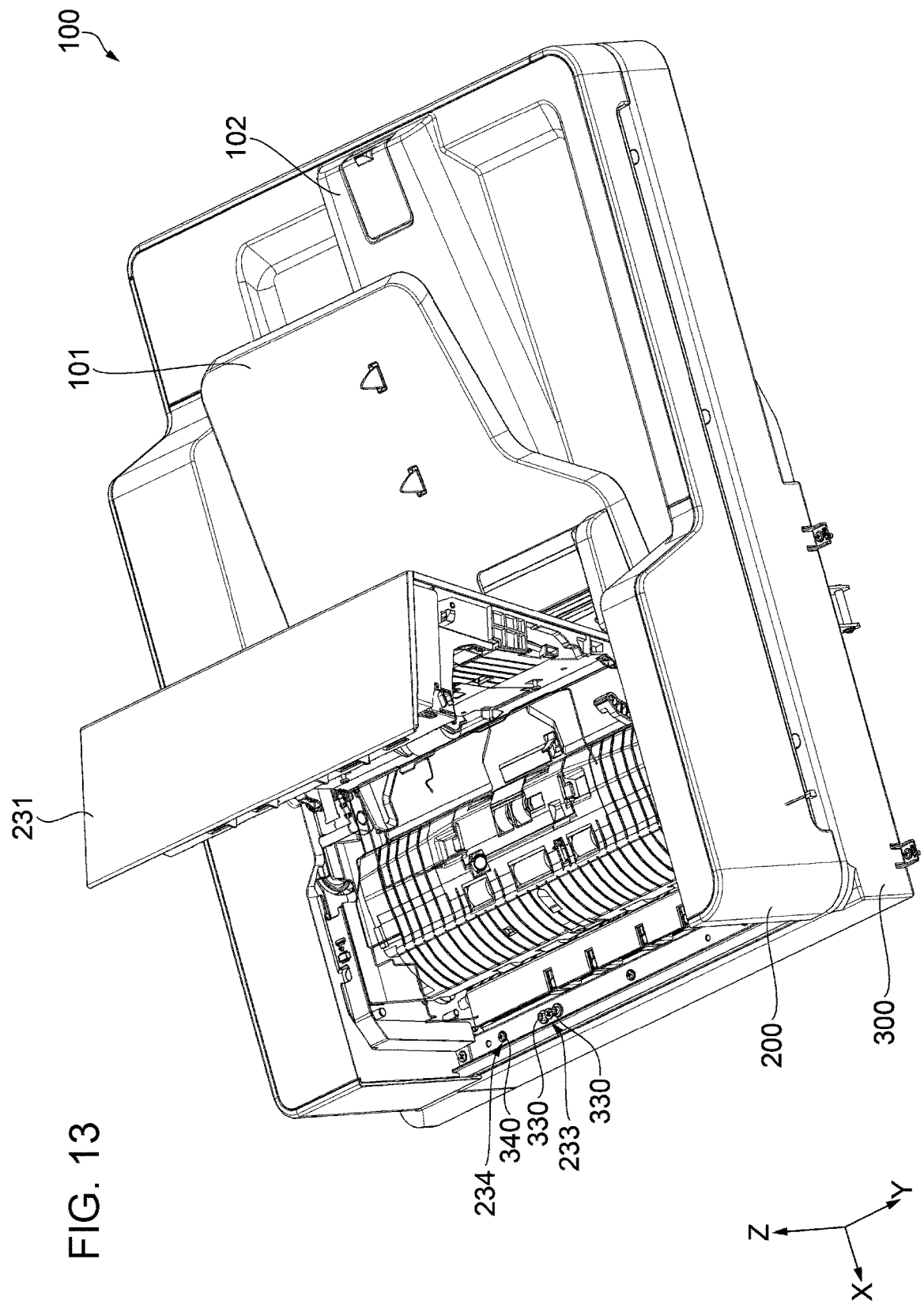
FIG. 13 is a perspective view illustrating how pins and a screw are stored.
Figure 14:
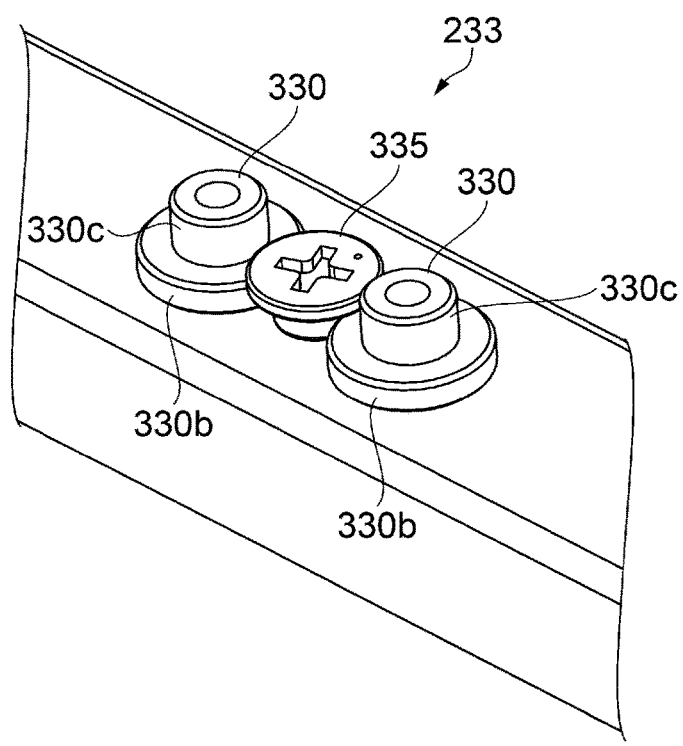
FIG. 14 is a magnified view of a pin storage area.

Pins 330 that are an example a "projecting portion" are arranged in the ADF 200 (see FIGS. 13 and 14). As indicated with dashed lines in FIG. 11, each pin 330 includes: a projecting portion 330a projecting in the +Z axis direction; a projecting portion 330c projecting in the −Z axis direction; and a flat portion 330b arranged between the projecting portion 330a and the projecting portion 330c. On a plan view in a direction from the projecting portion 330a to the projecting portion 330c, the projecting portions 330a, 330c and the flat portion 330b are circular. The external diameter (diameter) of the flat portion 330b is larger than those of the projecting portions 330a, 330c. In addition, the projecting portions 330a, 330c have the same shape. The pin 330 has a configuration in which the projecting portions having the same shape (the projecting portions 330a, 330c) are arranged facing each other with the flat portion 330b interposed in between.

As illustrated in FIG. 11, a hole (through-hole) 331a that allows either of the projecting portions 330a, 330c to be fitted into it is provided at the center of the recessed portion 331. Thus, either of the projecting portions 330a, 330c can be fitted into the hole 331a of the recessed portion 331. Specifically, the projecting portion 330a can be fitted into the recessed portion 331, or the projecting portion 330c can be fitted into the recessed portion 331.

Moreover, either of the projecting portions 330a, 330c can be fitted into the recessed portion 332, like into the recessed portion 331. In addition, either of the projecting portions 330a, 330c can be fitted into the two recessed portions 341, 342 provided to the external member 380-facing surface of the ADF 200, like into the recessed portion 331.

The pin 330 is attachable to and detachable from the recessed portions 331, 332.

The state where the pin 330 is attached to the recessed portions 331, 332 will be hereinafter referred to as an attached state, and the state where the pin 330 is detached from the recessed portions 331, 332 will be hereinafter referred to as an detached state.

For example, once the projecting portion 330a is fitted into the recessed portion 331, the projecting portion 330c projects out from the external member 380. Thereby, a new projecting portion (the projecting portion 330c) can be formed on the external member 380. Specifically, in the attached state where the pin 330 is attached to the recessed portion 331, the new projecting portion (the projecting portion 330c) is formed on the external member 380. When the closed state is established with the new projecting portion (the projecting portion 330c) formed on the external member 380, the new projecting portion (the projecting portion 330c) can be fitted into the recessed portion 341 in the ADF 200. In other words, when the closed state is established with the new projecting portion (the projecting portion 330c) formed on the external member 380, the new projecting portion (the projecting portion 330c) can be engaged with the recessed portion 341.

Similarly, once the projecting portion 330a is fitted into the recessed portion 332, the projecting portion 330c projects out from the external member 380. Thereby, a new projecting portion (the projecting portion 330c) can be formed on the external member 380. When the closed state is established with the new projecting portion (the projecting portion 330c) formed on the external member 380, the new projecting portion (the projecting portion 330c) can be fitted into the recessed portion 342 in the ADF 200. In other words, when the closed state is established with the new projecting portion (the projecting portion 330c) formed on the external member 380, the new projecting portion (the projecting portion 330c) can be engaged with the recessed portion 342.

In the document reader 100 in the closed state, the recessed portions 341, 342 coincide with the recessed portions 331, 332, respectively, on the plan view. Thus, in the closed state, the state where the new projecting portions (the projecting portions 330c) formed on the external member 380 are engaged with the recessed portions 341, 342 in the ADF 200 is a state where the recessed portions 341, 342 coincide with the recessed portions 331, 332 appropriately on the plan view, that is, a state where the ADF 200 is appropriately positioned relative to the scanner unit 300.

For this reason, the position of the ADF 200 relative to the scanner unit 300 can be appropriately adjusted by adjusting the positions of the ADF 200 and the scanner unit 300 relative to each other in a way that, in the attached state, the new projecting portions (the projecting portions 330c) formed on the external member 380 are engaged with the recessed portions 341, 342. In other words, in this embodiment, the pins 330 are attachable to and detachable from the recessed portions 331, 332 formed in the scanner unit 300; and in the attached state, the ADF 200 is positioned relative to the scanner unit 300 by fitting the new projecting portions (the projecting portions 330c), formed on the external member 380, into the recessed portions 341, 342 in the ADF 200.

Furthermore, whether the adjustment of the Y axial position of the ADF 200 using the above-discussed positioning mechanism is appropriate can be checked by, in the closed state, engaging the new projecting portions (the projecting portions 330c), formed on the external member 380, with the recessed portions 341, 342 in the ADF 200.

In the work of assembling the ADF 200 with the scanner unit 300 when the document reader 100 is produced and when the document reader 100 is maintained or repaired, the ADF 200 can be efficiently assembled with the scanner unit 300 with high precision by: first, adjusting the positions of the scanner unit 300 and the ADF 200 relative to each other using the recessed portions 341, 342, the pins 330, and the recessed portions 331, 332; and, thereafter, adjusting the position of the ADF 200 relative to the scanner unit 300 using the above-discussed positioning mechanism.

Moreover, in the work of assembling the ADF 200 with the scanner unit 300, the ADF 200 can be assembled with the scanner unit 300 with high precision by: first, adjusting the position of the ADF 200 relative to the scanner unit 300 using the above-discussed positioning mechanism; thereafter, checking whether the position of the ADF 200 relative to the scanner unit 300 is appropriate by use of the recessed portions 341, 342, the pins 330, and the recessed portions 331, 332; and if the position is appropriate, fixing the positioning mechanism (the projecting portions 121, the slits 320, and the adjusting screws 307a) using the fixing screws 308a.

In other words, the configuration preferably includes the recessed portions 341, 342 formed on the free end side of the ADF 200 at least away from the scanner unit 300, and the pins 330 arranged on the scanner unit 300, as well as fixes the positioning mechanism (the projecting portions 121, the slits 320 and the adjusting screws 307a) in a state where the scanner unit 300 and the ADF 200 are put in place with the projecting portions on the scanner unit 300 (the projecting portions formed when the attached state is established) engaged with the recessed portions 341, 342.

In this embodiment, during non-routine work such as the production of the document reader 100, and the maintenance or repair of the document reader 100, the new projecting portions are formed on the external member 380 by fitting the pins 330 into the recessed portions 331, 332, and thereby the scanner unit 300 and the ADF 200 are appropriately positioned relative to each other, or it is checked whether the scanner unit 300 and the ADF 200 are appropriately positioned relative to each other.

In contrast, during the routine work (normal use) such as the printer 10's printing of images on sheets and the document reader 100's reading of images from documents, the new projecting portions to be formed on the external member 380 by fitting the pins 330 into the recessed portions 331, 332 are not needed. In addition, the existence of the unnecessary projecting portions on the external member 380 is likely to cause problems such as a problem that the unnecessary projecting portions fold edges of sheets and documents.

With this taken into consideration, this embodiment has a configuration in which: the pins 330 are stored in the ADF 200 during the routine work (normal use); and the pins 330 can be taken out of the ADF 200 when the non-routine work starts. Thus, in this embodiment, during the routine work, there are no unnecessary projecting portions which would otherwise be formed by the pins 330, and there are accordingly no problems that would be caused the unnecessary projecting portions. Furthermore, during the routine work, the recessed portion 332 is closed with a cap (not illustrated), and foreign matter is accordingly less likely to enter the recessed portion 332.

It should be noted that, like the recessed portion 332, the recessed portions 331, 341, 342 may be closed with their respective caps during the routine work.

As illustrated in FIG. 12, the recessed portion 332 is provided with: a hole 332a that is an example of a "second through-hole," and that allows a screw 340 indicated with dashed lines in FIG. 12 to penetrate through it; and a support portion 332b that is capable of supporting the flat portion 330b of the pin 330. The hole 332a is provided at the center of the recessed portion 332. The support portion 332b is provided surrounding the hole 332a.

This configuration makes it possible to fit the pin 330 into the recessed portion 332 with the supporting portion 332b supporting the flat portion 330b, in addition to making it possible to penetrating the screw 340 through the recessed portion 332. Once the pin 330 is fitted into the recessed portion 332, this configuration makes it possible to make either of the projecting portions 330a, 330c project out from the recessed portion 332, and thereby to form the new projecting portion on the external member 380.

In closed state, this configuration makes it possible to penetrate the screw 340 through the recessed portion 332 and the recessed portion 342, and to thereby fix the ADF 200 and the scanner unit 300 together lest the ADF 220 be opened from or closed to the scanner unit 300. In addition, the detaching of the screw 340 that is penetrated through the recessed portions 332, 342 makes it possible to return the ADF 200 to a condition of being openable from or closable to the scanner unit 300.

The work of replacing the recording head with a new one is carried out while the document reader 100 is kept in the state of being open from the printer 10 (the state illustrated in FIG. 2). When the document reader 100 is opened from the printer 10, too, the force that tries to open the ADF 200 from the scanner unit 300 is pressed against the ADF 200 from each hinge 110.

Thus, when the document reader 100 is opened from the printer 10 for the purpose of the recording head replacement, there is likelihood that: the pressing force from the hinge 110 moves the ADF 200 faster than the scanner unit 300; and the ADF 200 opens from the scanner unit 300 quickly. In addition, when the ADF 200 is about to further move beyond the predetermined open-close range, there is likelihood that: a force that tries to inhibit the quick movement of the ADF 200 is pressed against the ADF 200; a strong impact is accordingly applied to the ADF 200; and the strong impact mechanically damages the ADF 200.

With this taken into consideration, in this embodiment, the occurrence of the above-discussed quick movement of the ADF 200 (the strong impact on the ADF 200) is prevented during the recording head replacement by: fixing the ADF 200 and the scanner unit 300 together by penetrating the screw 340 through the recessed portion 332 and the recessed portion 342; and thereafter opening the document reader 100 from the printer 10.

After the document reader 100 is closed to the printer 10 as the recording head replacement is completed, the ADF 200 is returned to the condition of being openable from and closable to the scanner unit 300 by detaching the screw 340 that is penetrated through the recessed portion 332 and the recessed portion 342.

Similarly, before non-routine work such as the maintenance or repair of the printer 10 other than component replacement, the ADF 200 and the scanner unit 300 are fixed together by penetrating the screw 340 through the recessed portion 332 and the recessed portion 342, and thereafter, the document reader 100 is opened from the printer 10. After the maintenance or repair of the printer 10, the ADF 200 is returned to the condition of being openable from and closable to the scanner unit 300 by detaching the screw 340 that is penetrated through the recessed portion 332 and the recessed portion 342.

In other words, the scanner unit 300 is openable from the structure (the printer 10) under the scanner unit 300 by turning around an turn axis located under the turn shafts 150 of the hinges 110; the recessed portions 341, 342 are formed from the through-holes; the recessed portion 332 to which the pin 330 is detachable and attachable includes the hole 332*a* that is opened to the inside of the scanner unit 300 when the pin 330 is detached from the recessed portion 332; and the ADF 200 and the scanner unit 300 can be fastened together by penetrating the screw 340 through the recessed portion 342 and the hole 332*a* of the recessed portion 332. This configuration inhibits the above-discussed quick movement of the ADF 200 (the strong impact on the ADF 200) when the scanner unit 300 opens from the printer 10 as the scanner unit 300 turns around under the turn shafts 115 of the hinges 110.

It should be noted that the configuration for inhibiting the above-discussed quick movement of the ADF 200 is not limited to that in which the ADF 200 and the scanner unit 300 are fixed together by penetrating the screw 340 through the recessed portion 332 and the recessed portion 342, and may be one in which: a new through-holes are provided to the ADF 200 and the scanner unit 300; and the ADF 200 and the scanner unit 300 are fixed together by penetrating the screw 340 through the new through-holes.

FIG. 13 is a perspective view illustrating how the pins and the screw are stored. FIG. 14 is a magnified view of a pin storage area.

Like the pins 330, the screw 340 is used for the non-routine work, but not for the routine work. For this reason, in this embodiment, the pins 330 and the screw 340 can be stored in the ADF 200 while the routine work is being carried out, and can be taken out of the ADF 200 when the non-routine work starts.

To put it specifically, as illustrated in FIGS. 13 and 14, the lateral surface-side cover 231 provided to a lateral surface side of the ADF 200 is openable and closable. The inside of the ADF 200 can be exposed to the outside by opening the lateral surface-side cover 231. When the lateral surface-side cover 231 is opened to expose the inside of the ADF 200 to the outside, the two pins 330 are stored in an area 233, and the screw 340 is stored in an area 234.

To put it specifically, the area 233 allows the two pins 330 to be inserted in it, and a screw 335 to be screwed into its part between the two pins 330. The two pins 330 are fixed to the area 233 by: inserting the two pins 330 into the area 233; and thereafter screwing the screw 335 into it to press the two pins 330.

The area 234 allows the screw 340 to be screwed into it. The screw 340 is fixed to the area 234 by being screwed into the area 234.

Furthermore, the area 233 and the area 234 are arranged in a +X axial end portion of the ADF 200 in order to locate the screw 340 and the pins 330 near to each other.

Since the pins 330 and the screw 340 are stored in the ADF 200, a problem of losing the pins 330 and the screw 340 during the routine work is less likely to take place.

In addition, since the pins 330 and the screw 340 are located near to each other, the pins 330 and the screw 340 are easier to take out when the non-routine work starts than if the pins 330 and the screw 340 would be located far from each other, and the condition of the pins 330 and the screw 340 can be easily discerned. For example, if an abnormal condition in which one of the pins 330 and the screw 340 goes missing takes place, the abnormal condition can be noticed without delay.

Figure 15:
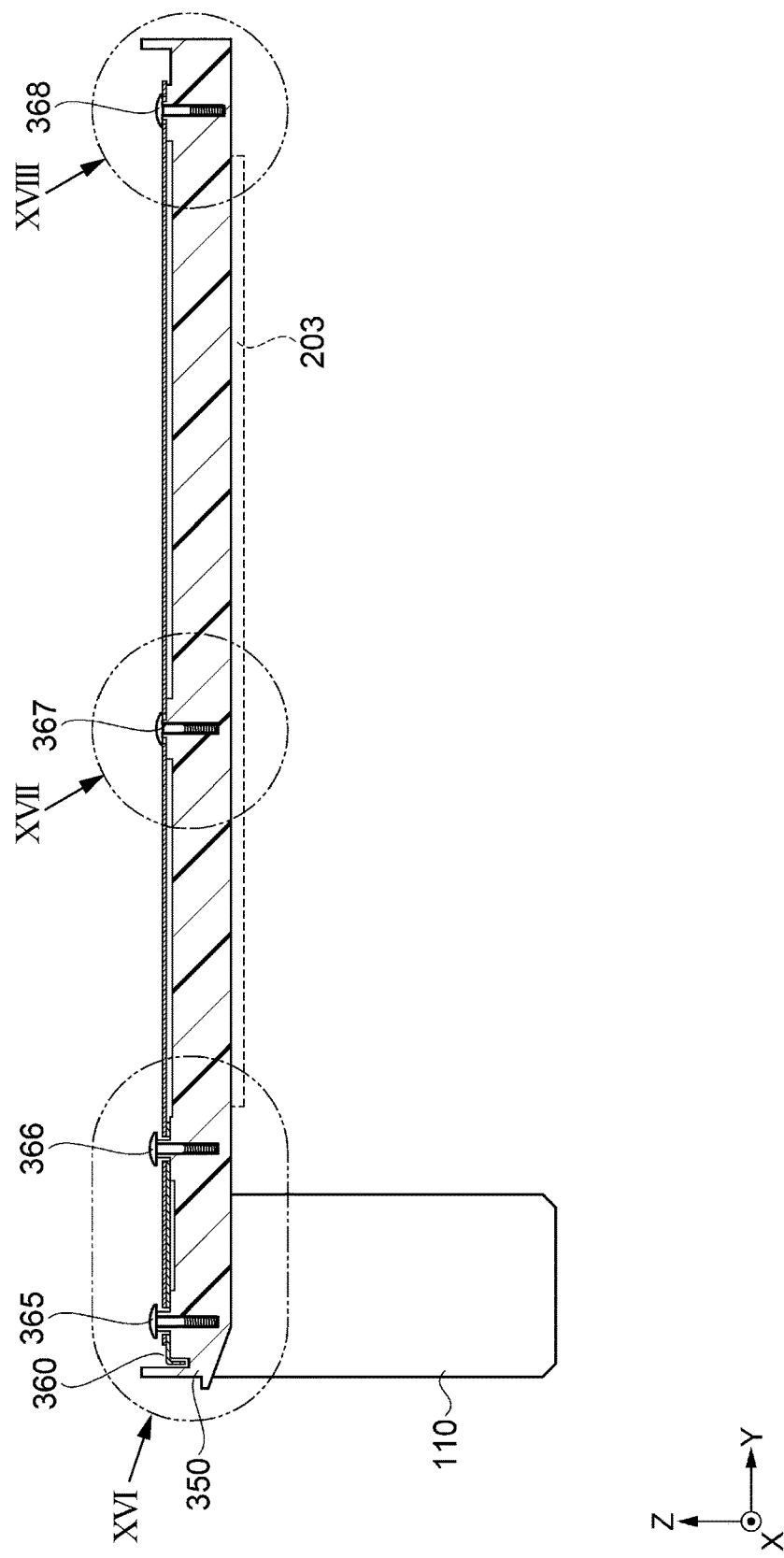
FIG. 15 is a schematic cross-sectional view of an ADF taken along the XV-XV line in FIG. 4.
Figure 16:
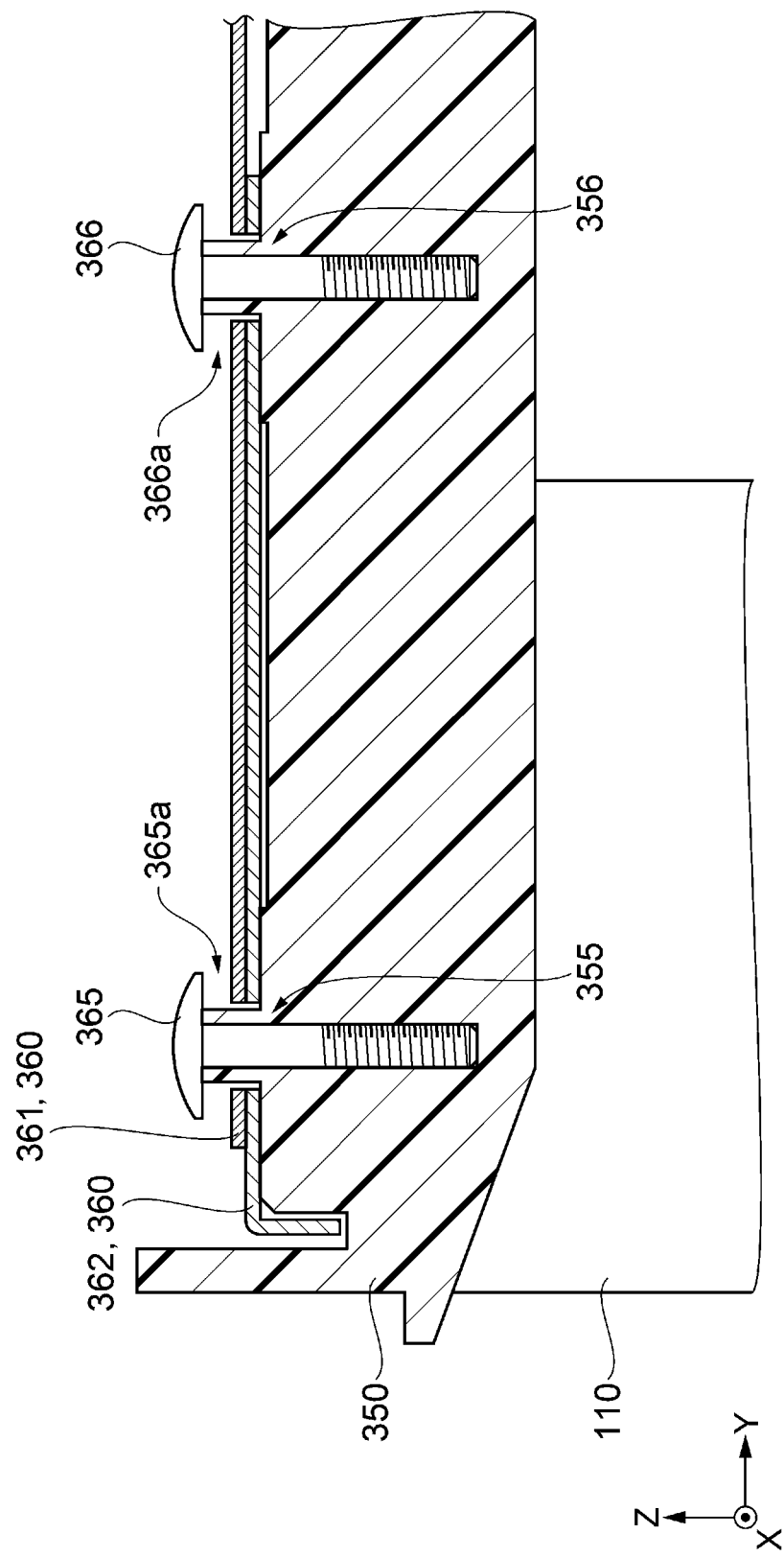
FIG. 16 is a schematic cross-sectional view of an area XVI encircled by a chain double-dashed line in FIG. 15.
Figure 17:
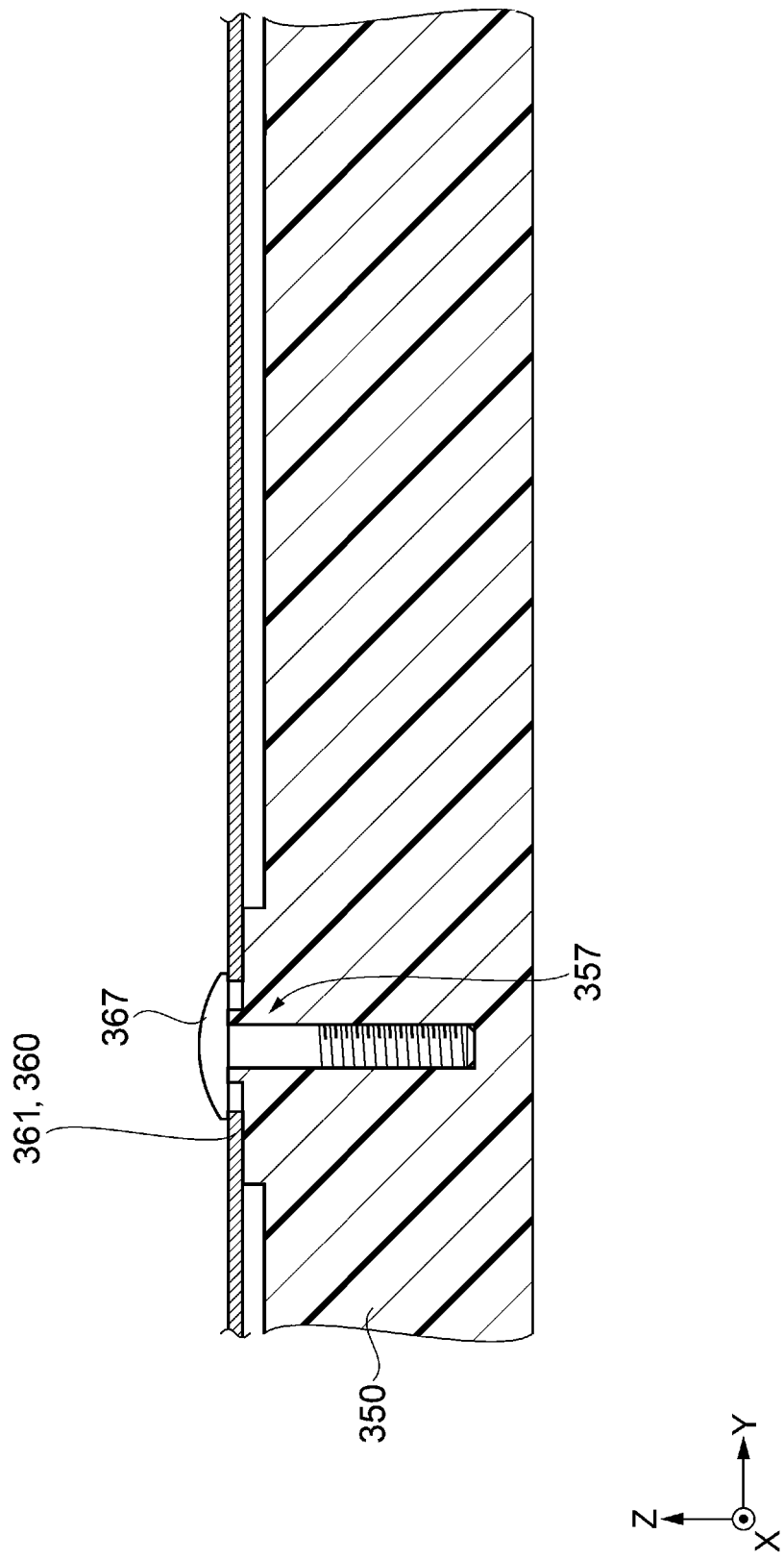
FIG. 17 is a schematic cross-sectional view of an area XVII encircled by another chain double-dashed line in FIG. 15.
Figure 18:
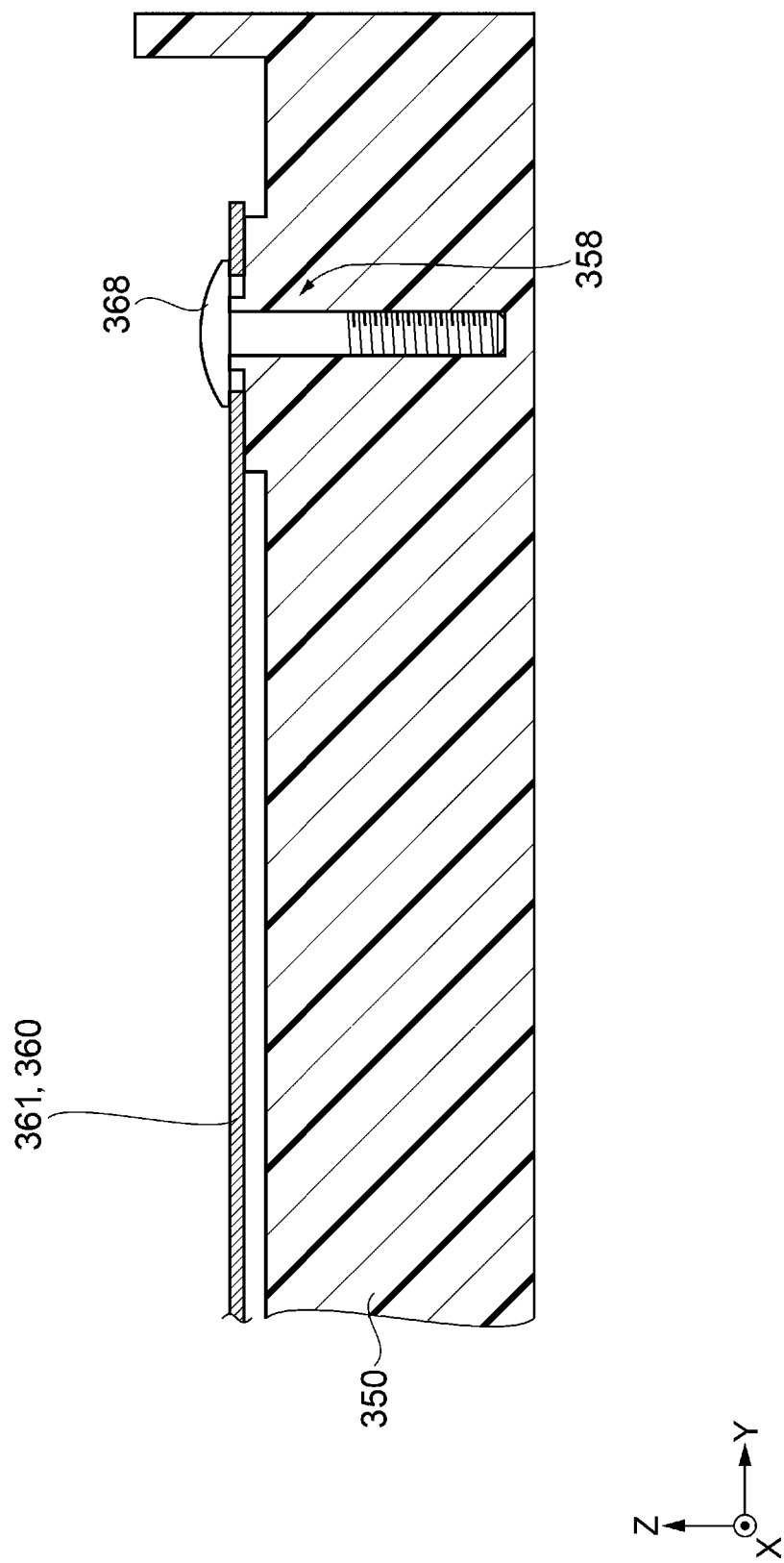
FIG. 18 is a schematic cross-sectional view of an area XVIII encircled by the other chain double-dashed line in FIG. 15.

FIG. 15 is a schematic cross-sectional view of the ADF taken along the XV-XV line in FIG. 4. FIG. 16 is a schematic cross-sectional view of an area XVI encircled by a chain double-dashed line in FIG. 15. FIG. 17 is a schematic cross-sectional view of an area XVII encircled by another chain double-dashed line in FIG. 15. FIG. 18 is a schematic cross-sectional view of an area XVIII encircled by the other chain double-dashed line in FIG. 15.

FIGS. 15 to 18 illustrate components that are needed for the following descriptions, and omit components that are not needed for the following description.

As illustrated in FIGS. 15 and 16, the ADF 200 includes a resin member 350 and a sheet metal member 360 that are arranged in this order from the hinge 100 side. The resin member 350 is a member serving as the base of the ADF 200, and is arranged substantially throughout the ADF on a plan view from the Z axis direction. The sheet metal member 360 is a member provided in order to increase the mechanical strength of the resin member 350. The provision of the sheet metal member 360 makes it possible to arrange the resin member 350 along the XY plane (the horizontal plane). In addition, the platen mat 203 is joined to a scanner unit 300-facing side of the resin member 350 (see FIG. 3).

Moreover, the sheet metal member 360 is formed from: a first member 361 arranged on its +Z axial side; and a second member 362 arranged on its −Z axial side. The first member 361 is arranged substantially throughout the ADF on the plan view from the Z axis direction. The second member 362 is arranged near the hinges 110.

On the plan view from the Z axis direction, the first member 361 and the second member 362 are arranged in an area where the hinges 110 are arranged. This makes the mechanical strength of the area where the hinges 110 are arranged greater than that of the other area where no hinges 110 are arranged.

The area where the hinges 110 are arranged on the plan view from the Z axis direction will be hereinafter referred to as a hinge 110-arranged area.

As illustrated in FIGS. 16 to 18, in the hinge 110-arranged area and an area near the hinge 110-arranged area, the resin member 350, the second member 362 and the first member 361 are arranged in this order in the +Z axis direction. Two screws 365, 366 that fasten the resin member 350, the second member 362 and the first member 361 together with their screw effects are further provided in the hinge 110-arranged area and the area near the hinge 110-arranged area. The screw 365 is arranged to the −Y axial side from the screw 366 (in the −Y axial end portion of the ADF 200).

In an area away from the hinge 110-arranged area, the resin member 350 and the first member 361 are arranged in this order in the +Z axis direction. Two screws 367, 368 that fasten the resin member 350 and the first member 361 together with their screw effects are further provided in an area away from the hinge 110-arranged area. The screw 367 is arranged near the Y axial center part of the ADF 200, and the screw 368 is arranged in the +Y axial end portion of the ADF 200.

As discussed above, the screw 365, the screw 366, the screw 367 and the screw 368 are arranged on the ADF 200 in this order from the −Y axial end portion to the +Y axial end portion.

The resin member 350 is provided with: a screw hole 355 that allows the screw 365 to be screwed into it; a screw hole 356 that allows the screw 366 to be screwed into it; a screw hole 357 that allows the screw 367 to be screwed into it; and a screw hole 358 that allows the screw 368 to be screwed into it. In addition, the first member 361 is provided with through-holes that allow the screws 365, 366, 367, 368 to penetrate through them.

Around the center of the ADF 200, the screw 367 is screwed into the screw hole 357 in the resin member 350, and the sheet metal member 360 (the first member 361) is fastened to the resin member 350 using the screw 367 (see FIG. 17). Similarly, in the +Y axial end portion of the ADF 200, the screw 368 is screwed into the screw hole 358 in the resin member 350, and the sheet metal member 360 (the first member 361) is fastened to the resin member 350 using the screw 368 (see FIG. 18).

On the other hand, in the −Y axial end portion of the ADF 200, the screws 365, 366 are screwed into the screw holes 355, 356 in the resin member 350, but the sheet metal member 360 (the first member 361, the second member 362) are not fastened to the resin member 350 using the screws 365, 366. In other words, clearances 365a, 366a are provided between the sheet metal member 360 and the screws 365, 366.

To put it specifically, in the hinge 110-arranged area, a screw 365-touching surface of the screw hole 355 is located higher than the sheet metal member 360 (the first member 361) (i.e. to the +Z axial side from the sheet metal member 360). Thus, when the screw 365 is screwed into the screw hole 355 in the resin member 350, the clearance 365a is formed between the sheet metal member 360 and the screw 365. Furthermore, in the area near the hinge 110-arranged area, a screw 366-touching surface of the screw hole 356 is located higher than the sheet metal member 360 (the first member 361) (i.e. to the +Z axial side from the sheet metal member 360). Thus, when the screw 366 is screwed into the screw hole 356 in the resin member 350, the clearance 366a is formed between the sheet metal member 360 and the screw 366.

As discussed above, each hinge 100 makes the force against the force F1 caused by the weight of the ADF 200 that tries to close the ADF 200 to the scanner unit 300 (the drag F2 that tries to open the ADF 200 from the scanner unit 300) work on the ADF 200. In the part of the ADF 200 where the ADF 200 is fixed to the hinge 100, the drag F2 that tries to open the ADF 200 from the scanner unit 300 works as a force with which the hinge 110 tries to lift the ADF 200 (the force in the +Z axis direction).

As discussed above, the force with which the hinge 110 tries to lift the ADF 200 is pressed against in the hinge 110-arranged area.

If in the hinge 110-arranged area, the sheet metal member 360 were fastened to the resin member 350 using the screws 365, 366, the following problems would occur in chain reaction. The force with which the hinge 110 tries to lift the ADF 200 would cause a problem of deformation of the sheet metal member 360. For example, the force with which the hinge 110 tries to lift the ADF 200 would deform the sheet metal member 360 into undulating shapes. In addition, the force would deform the sheet metal member 360 in the area near the hinge 100-arranged area, too.

As a result, the resin member 350 would become deformed into shapes corresponding to the shapes of the sheet metal member 360, and the platen mat 203 joined to the scanner unit 300-facing side of the resin 350 would also become deformed. When the ADF 200 is closed to the scanner unit 300, the platen mat 203 would no longer evenly press a document, mounted on the platen glass 375, against the platen glass 375, and the read surface of the document would not come into close contact with the platen glass 375. Accordingly, the scanner unit 300 would have difficulty in evenly reading images from the document.

With this taken into consideration, this embodiment is designed to inhibit the problem that the sheet metal member 360 becomes deformed by the force with which the hinge 110 tries to lift the ADF 200.

To put it specifically, in the hinge 100-arranged area, in a case where the screw 365 is screwed into the screw hole 355 in the resin member 350, the clearance 365a is formed between the sheet metal member 360 and the screw 365. Thus, the sheet metal member 360 is not influenced by the force with which the hinge 110 tries to lift the ADF 200. Furthermore, in the area near the hinge 100-arranged area, in a case where the screw 366 is screwed into the screw hole 356 in the resin member 350, the clearance 366a is formed between the sheet metal member 360 and the screw 366. Thus, the sheet metal member 360 is not influenced by the force with which the hinge 110 tries to lift the ADF 200.

This configuration makes it possible to inhibit the problem that the scanner unit 300 would have difficulty in evenly reading the images from the document if the sheet metal member 360, the resin member 350 and the platen mat 203 were deformed.

Figure 19:
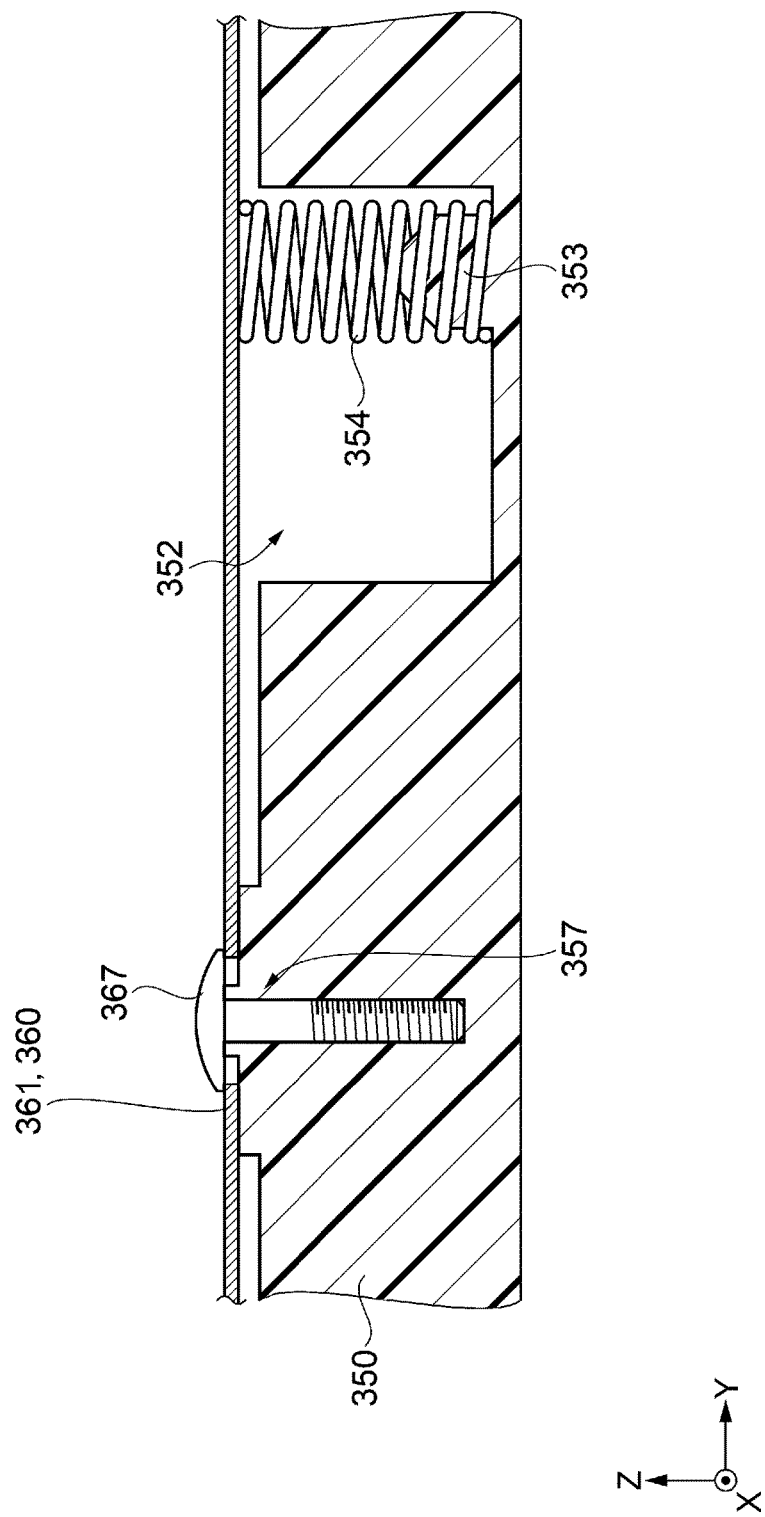
FIG. 19 is a schematic cross-sectional view of a document reader according to a modification.

FIG. 19 corresponds to FIG. 17, and is a schematic cross-sectional view of a document reader according to a modification.

In an area XVIII in the document reader 100 according to the modification, a recessed portion 352 is provided to the resin member 350, and a spring 354 is provided inside the recessed portion 352. This is what makes FIG. 19 different from FIG. 17.

As illustrated in FIG. 19, in the resin member 350 near the center of the ADF 200, the recessed portion 352 is provided near a part of the resin member 350 into which the screw 367 is screwed. In addition, an elastic member (the spring 354) and a protrusion 353 that allows the elastic member (the spring 354) to be attached to it are provided inside the recessed portion 352. Moreover, the elastic member (the spring 354) is attached to the protrusion 353 in a way that the elastic member (the spring 354) is capable of pressing a force in the +Z axis direction against the sheet metal member 360.

This configuration makes it possible to securely inhibit the deformation of the sheet metal member 360.

Figure 20:
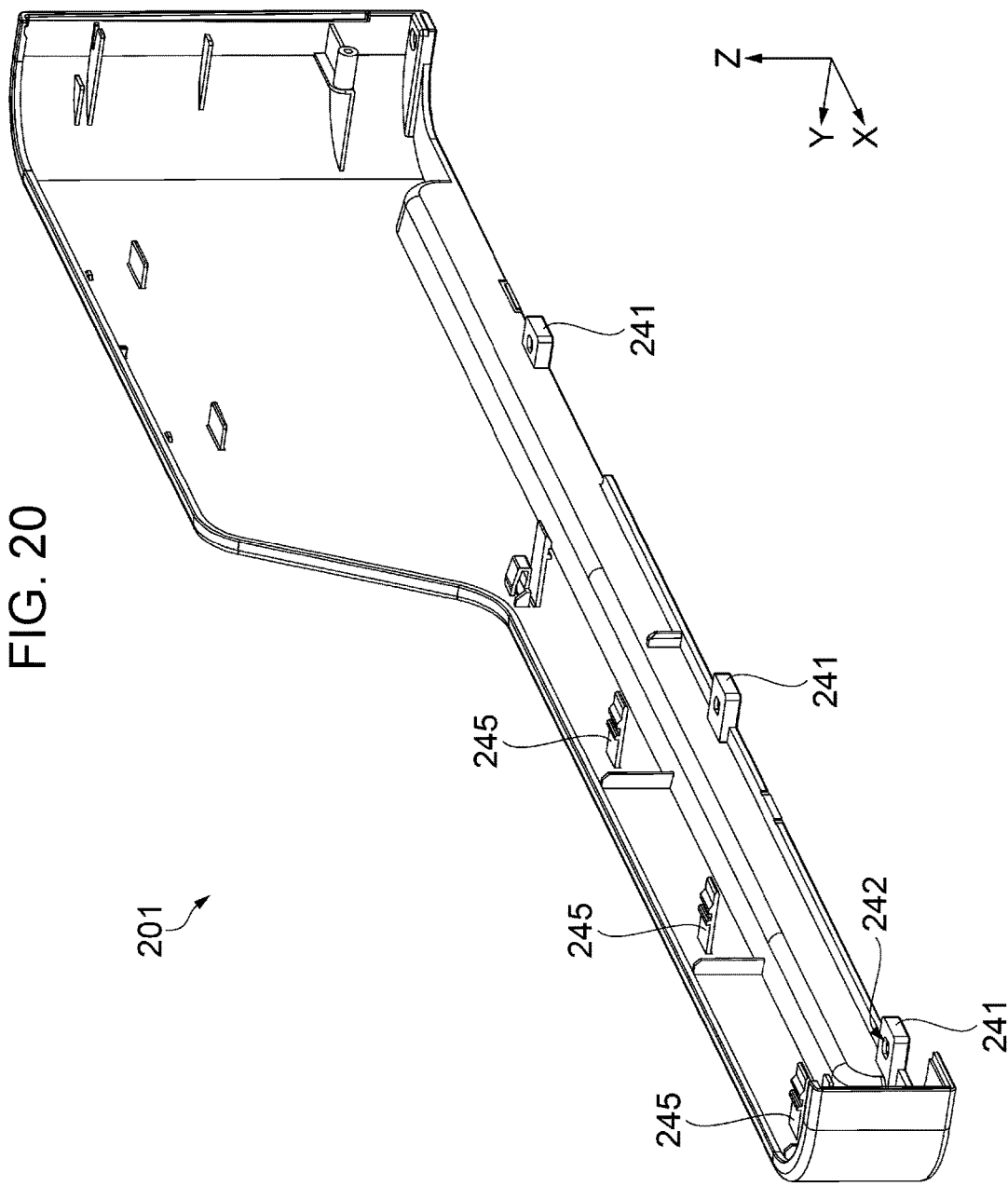
FIG. 20 is a perspective view illustrating how a front-side cover looks.
Figure 21:
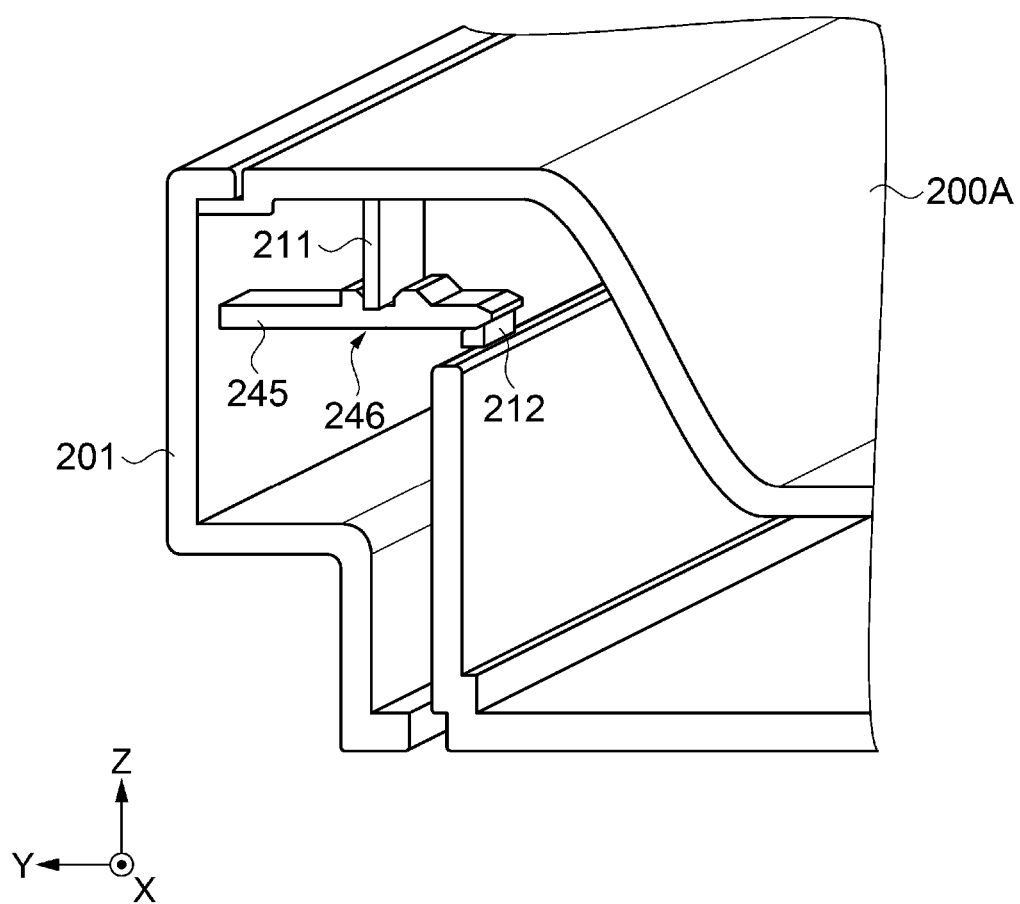
FIG. 21 is a schematic cutaway view illustrating how the front-side cover is fixed to a main body of the ADF.

FIG. 20 is a perspective view illustrating how the front-side cover looks. FIG. 21 is a schematic cutaway view illustrating how the front-side cover is fixed to a main body of the ADF.

As illustrated in FIGS. 20 and 21, the front-side cover 201 includes: projecting portions 241 projecting in the −Y axis direction; and ribs 245 projecting in the −Y axis direction. In addition, each projecting portion 241 is provided with a screw hole 242, and each rib 245 is provided with a recessed/projecting portion 246. Three projecting portions 241 are provided to a −Z axial end portion of the front-side cover 201, and are arranged in the X axis direction. Three ribs 245 are arranged to the +Z axial side from the projecting portions 241, and are provided there in the X axis direction.

The front-side cover 201 is a member that is longer in the X axis direction. The front-side cover 201 has a portion with a larger Z axial dimension in its −X axial side, and a portion with a smaller Z axial dimension in its +X axial side. The ribs 245 are provided in a part of the front-side cover 201 that corresponds to the portion with the smaller Z axial dimension.

The projecting portions 241 are fixed to the main body 220A of the ADF 200 using screws (not illustrated).

Furthermore, the main body 220A is provided with: projecting portions 211 that can be respectively fitted into the recessed/projecting portions 246 of the ribs 245; and projecting portions 212 that respectively support opposite parts of the ribs 245 from the recessed/projecting portions 246. The front-side cover 201 is attached to the main body 220A in a way that locates the ribs 245 between the projecting portions 211 and the projecting portions 212, respectively. Thereby, the recessed/projecting portions 246 of the ribs 245 are positioned and fixed by the projecting portions 211. In addition, the opposite parts of the ribs 245 from the recessed/projecting portions 246 are supported by the projecting portions 212.

As discussed above, in this embodiment, the front-side cover 201 is fixed to the main body 220A of the ADF 200 using both the projecting portions 241 and the ribs 245.

Since the front-side cover 201 is the member that is longer in the X axis direction, the front-side cover 201 is easily deformed (twisted) by an external force. For example, if the projecting portions 241 and the main body 220A were fixed together using the screws alone, the front-side cover 201 would become easily deformed (twisted) when an external force works on the front-side cover 201.

In this embodiment, since the front-side cover 201 is fixed to the main body 220A of the ADF 200 using both the projecting portions 241 and the ribs 245, the mechanical strength of the front-side cover 201 is greater while the front-side cover 201 is fixed to the main body 220A than if the front-side cover 201 were fixed to the main body 220A of the ADF 200 using the screws alone, and the front-side cover 201 is accordingly less likely to become deformed when an external force works on the front-side cover 201.

It should be noted that since in the front-side cover 201, the mechanical strength of its portion with the smaller Z axial dimension is less than the mechanical strength of its portion with the larger Z axial dimension, the mechanical strength of the portion with the smaller Z axial dimension in the front-side cover 201 is reinforced by providing the ribs 245 to the portion with the smaller Z axial dimension.

Specifically, since the front-side cover 201 is provided with the projecting portions 241 and the ribs 245 as well as the front-side cover 201 is fixed to the main body 220A of the ADF 200 using both the projecting portions 241 and the ribs 245, the problem that the front-side cover 201 becomes deformed (twisted) when an external force works on the front-side cover 201 is less likely to occur than if the front-side cover 201 were fixed to the main body 220A of the ADF 200 using the projecting portions 241 alone, and accordingly, the rigidity of the front-side cover 201 can be made larger.

Figure 22:
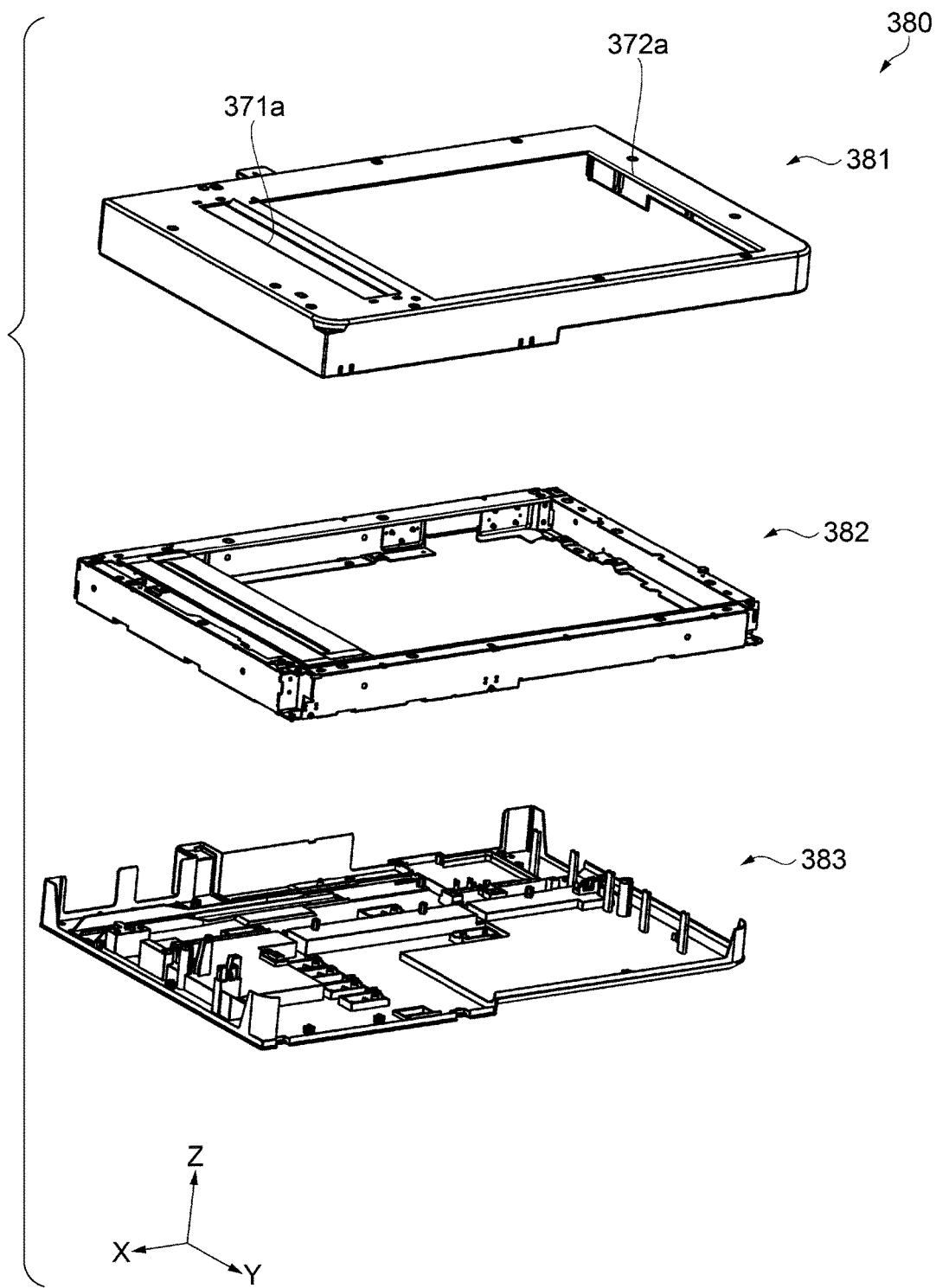
FIG. 22 is an exploded perspective view of the external member of the scanner unit.
Figure 23:
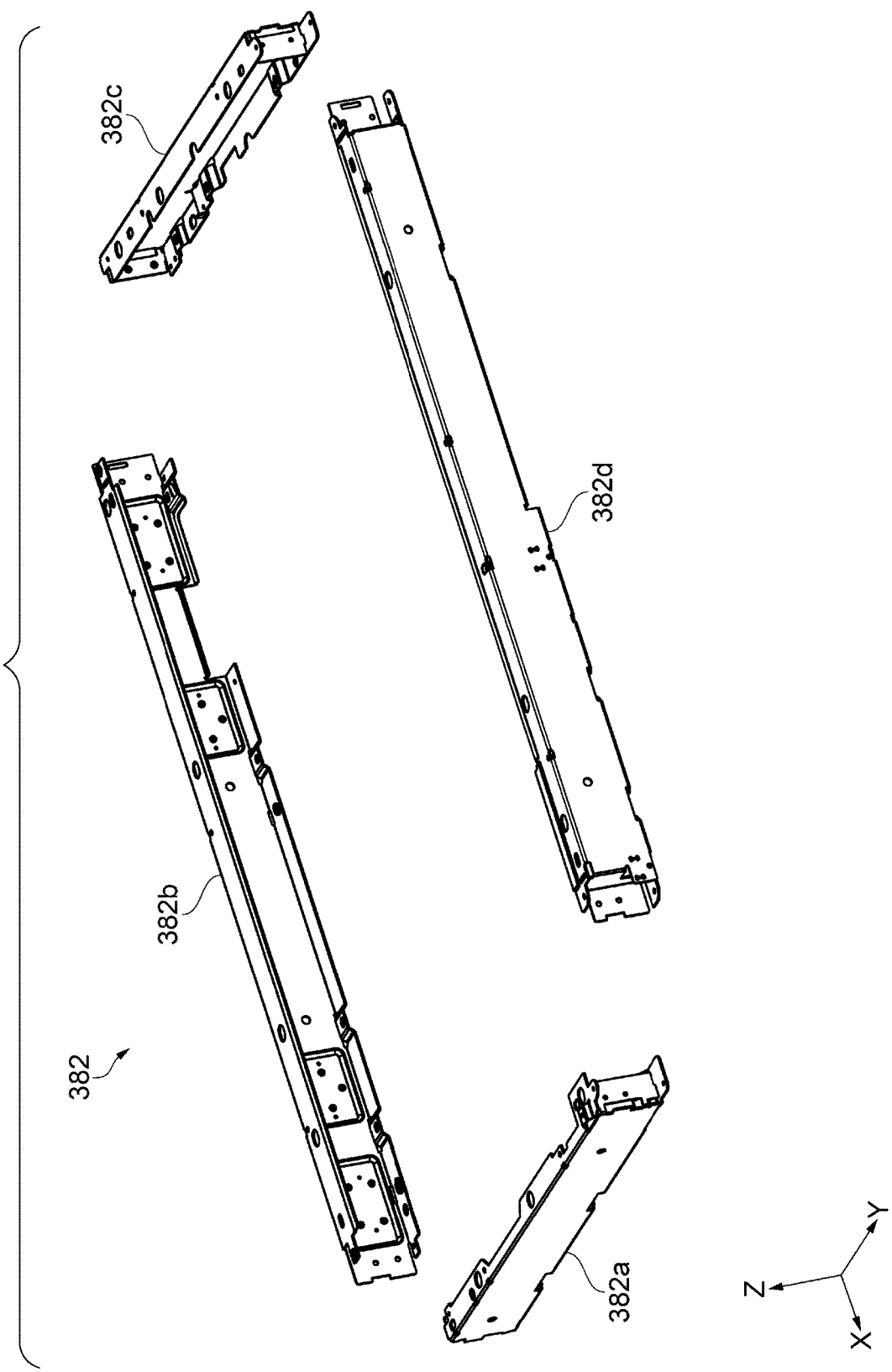
FIG. 23 is an exploded perspective view of a sheet metal member.
Figure 24:
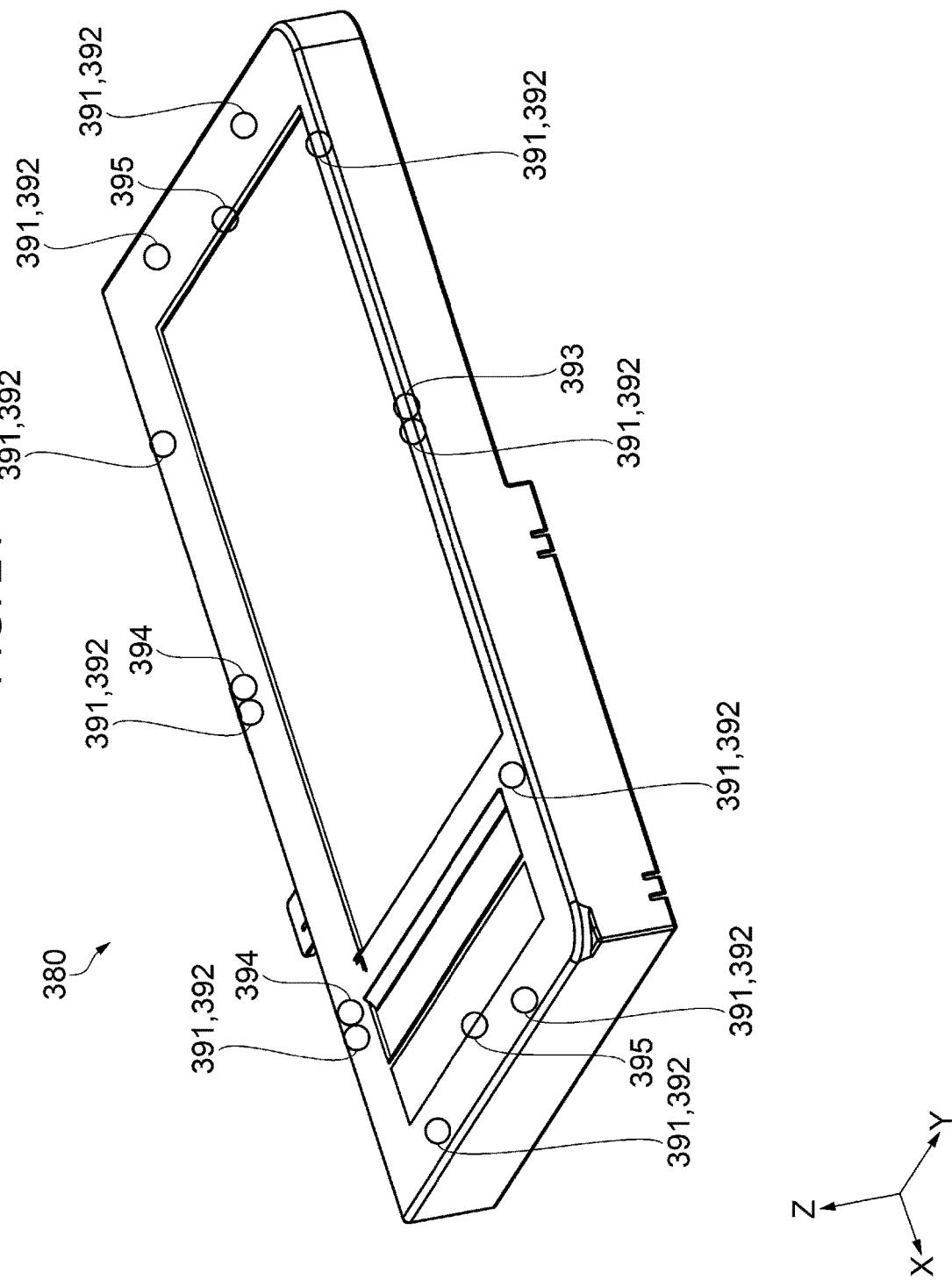
FIG. 24 is a perspective view of the external member.
Figure 25:
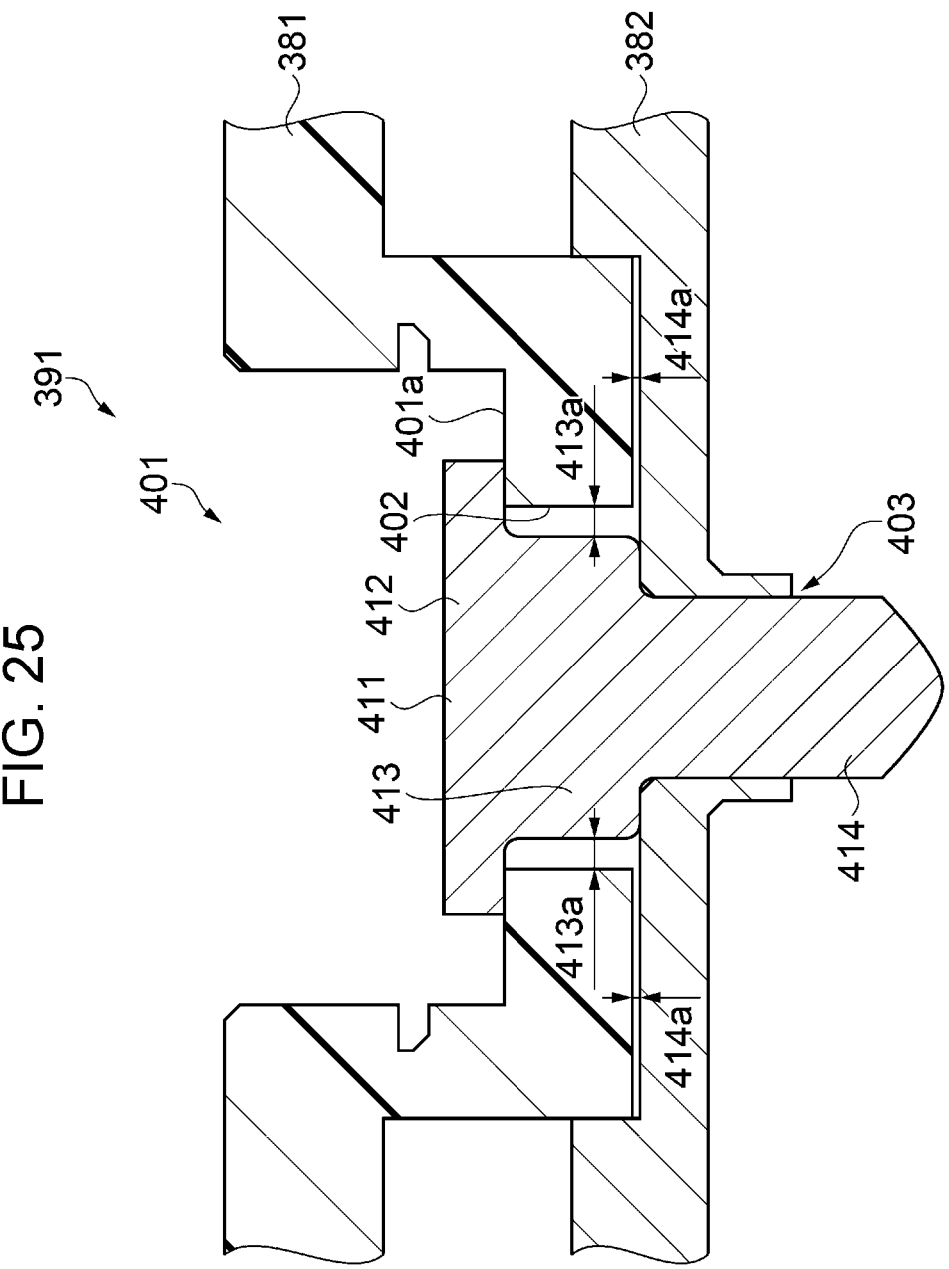
Figure 26:
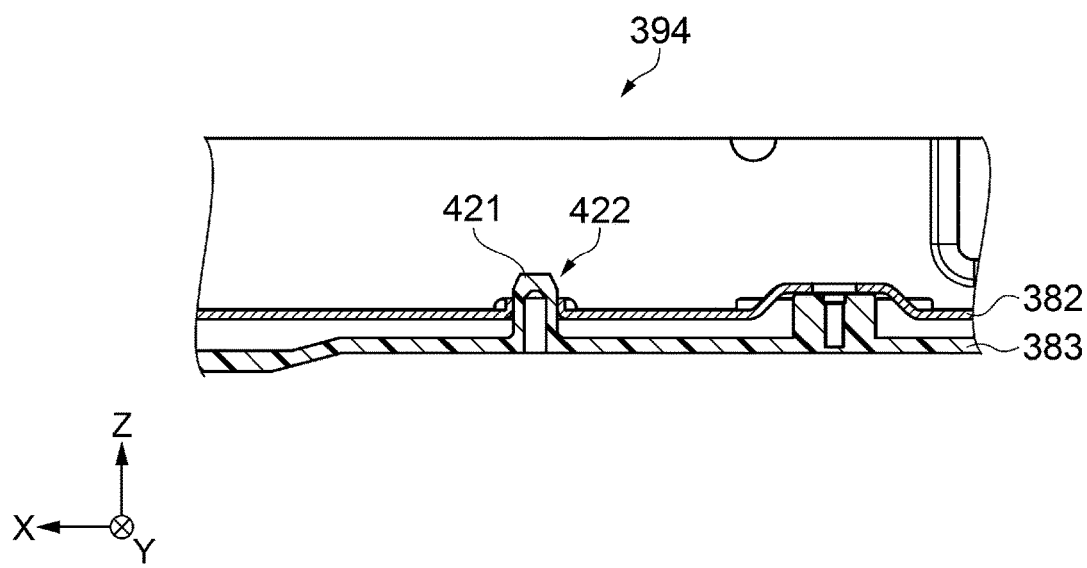
Figure 27:
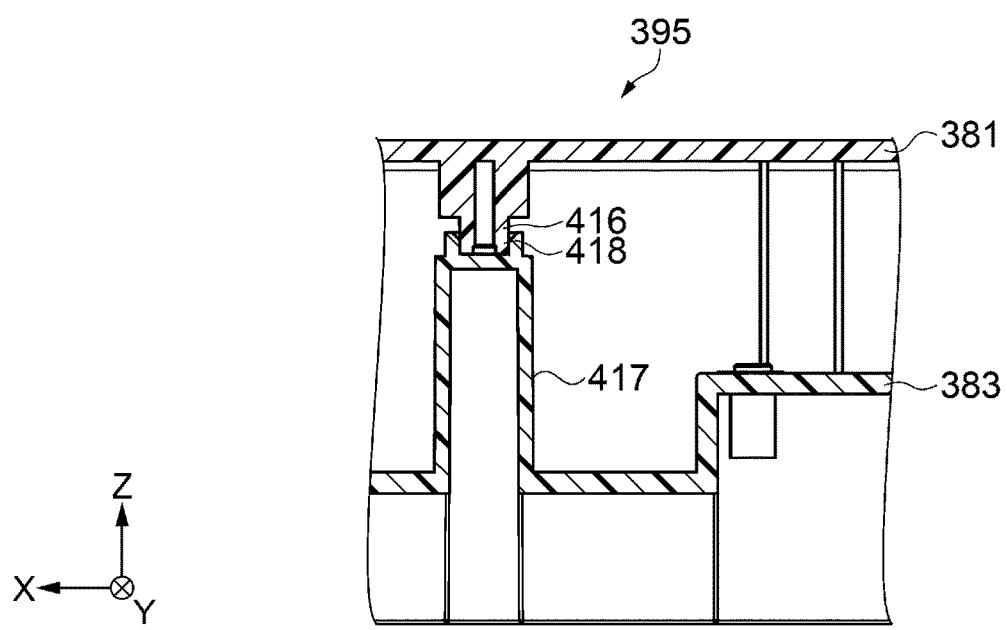

FIG. 22 is an exploded perspective view of the external member of the scanner unit. FIG. 23 is an exploded perspective view of a sheet metal member. FIG. 24 is a perspective view of the external member. FIG. 25 is a schematic view illustrating what condition a first fixing section is in. FIG. 26 is a schematic view illustrating what condition a fourth fixing section is in. FIG. 27 is a schematic view illustrating what condition a fifth fixing section is in.

It should be noted that FIG. 25 is a schematic plan view from the Y axis direction of a part where the first fixing section 391 is formed. FIG. 26 is a perspective view of a part where the fourth fixing section 394 is formed. FIG. 27 is a schematic cross-sectional view of a part of the external member 380 which is near a part where the fifth fixing section 395 is formed.

As illustrated in FIG. 22, the external member 380 is formed from an upper resin member 381, a sheet metal member 382, and a lower resin member 383. Specifically, the external member 380 is formed by stacking the lower resin member 383, the sheet metal member 382 and the upper resin member 381 in this order in the +Z axis direction.

An opening 371a is formed on a +X axial side of the upper resin member 381, and the opening 371a of the upper resin member 381 forms the opening 371 of the external member 380 (see FIG. 3). An opening 372a is formed on a −X axial side of the upper resin member 381, and the opening 372a of the upper resin member 381 forms the opening 372 of the external member 380 (see FIG. 3).

As illustrated in FIG. 23, the sheet metal member 382 is formed from four sheet metal members 382a, 382b, 382c, 382d. Each of the four sheet metal members 382a, 382b, 382c, 382d is a member whose cross section is shaped like the letter U. The members with the U-shaped cross section can make the sheet metal member 382 smaller in size and the mechanical strength of the sheet metal member 382 stronger than if the members were shaped like a flat plate. As discussed above, the sheet metal member 382 is formed by assembling the sheet metal members 382a, 382b, 382c, 382d, and has the U-shaped cross section. Accordingly, the sheet metal member 382 has the compact size, and the increased mechanical strength.

The sheet metal members 382a, 382b are respectively arranged in a +X axial end portion of the sheet metal member 382 and a −Y axial end portion of the sheet metal member 382. The sheet metal members 382c, 382d are respectively arranged in a −X axial end portion of the sheet metal member 382 and a +Y axial end portion of the sheet metal member 382. Furthermore, the sheet metal members 382c, 382d are arranged in the lower right corner portion (see FIG. 3) of the document reader 100 that is over the printer 10 with the space in which to provide the deliver unit 14 in between.

Since the document reader 100 (the scanner unit 300) over the printer 10 with the space in which to provide the deliver unit 14 in between is not supported by any part (the housing 11 of the printer 10), the document reader 100 (the scanner unit 300) is susceptible to deformation by an external force. If the document reader 100 would be deformed by an external force, the deformation would be likely to cause a problem that the ADF 200 does not transport documents appropriately, or a problem that the scanner unit 300 does not read images from document appropriately.

In this embodiment, since the scanner unit 300 over the printer 10 with the space in which to provide the deliver unit 14 in between has mechanical strength that is reinforced by the sheet metal member 382, the scanner unit 300 is less likely to become deformed by an external force, and accordingly inhibits a problem that the ADF 200 does not transport documents appropriately, and a problem that the scanner unit 300 does not read images from document appropriately.

As illustrated in FIG. 24, the external member 380 is provided with five types of fixing sections 391, 392, 393, 394, 395. The first fixing section 391 puts the upper resin member 381 and the sheet metal member 382 in place, and fixes them together. The second fixing section 392 puts the sheet metal member 382 and the lower resin member 383 in place, and fixes them together. The third fixing section 393 puts the upper resin member 381 and the sheet metal member 382 in place, and fixes them together. The fourth fixing section 394 puts the sheet metal member 382 and the lower resin member 383 in place, and fixes them together. The fifth fixing section 395 puts the upper resin member 381 and the lower resin member 383 place, and fixes them together.

Ten first fixing sections 391 and ten second fixing sections 392 are provided to the end portions of the frame-shaped external member 380. One third fixing section 393 is provided to a +Y axial end portion of the frame-shaped external member 380. Two fourth fixing sections 394 are provided to a −Y axial end portion of the frame-shaped external member 380. One fifth fixing section 395 is provided to each of a +X axial end portion and a −X axial end portion of the frame-shaped external member 380.

It should be noted that the number of first fixing sections 391, the number of second fixing sections 392, the number of third fixing sections 393, the number of fourth fixing sections 394 or the number of fifth fixing sections 395 are not limited to what has been discussed above, and is arbitrarily selectable. The locations of the first to fifth fixing sections 391, 392, 393, 394, 395 are also not limited to what has been discussed above, and are arbitrarily selectable.

The opening 371a of the upper resin member 381 forms the opening 371 of the external member 380. The opening 372a of the upper resin member 381 forms the opening 372 of the external member 380.

As discussed above, a document is arranged inside the opening 372 with the document touching edges of the opening 372 (or edges of the opening 372a), and where to mount the document is determined by the opening 372 of the external member 380 (or the opening 372a of the upper resin member 381). To put it specifically, the opening 372a of the upper resin member 381 serves as a reference for where to mount the document.

The lower resin member 383 is arranged to the −Z axial side from the platen glasses 374, 375. Furthermore, a movement mechanism (not illustrated) that moves the image reading unit is incorporated in the lower resin member 383. The image reading unit moves in the longitudinal direction of the lower resin member 383 (in the X axis direction). To put it specifically, the lower resin member 383 serves as a reference for the direction in which to move the image reading unit.

When images are read from a document without using the ADF 200, the opening 372a of the upper resin member 381 serves as the reference for where to mount the document, and the lower resin member 383 serves as the reference for the direction in which to move the image reading unit. For this reason, if either of the position of the opening 372a of the upper resin member 381 or the position of the lower resin member 383 were shifted from its right position, the scanner unit 300 would have difficulty in reading images from the document appropriately.

For this reason, the upper resin member 381 and the lower resin member 383 need to be arranged rightly in, and fixed to, their respective predetermined positions lest their positions be shifted therefrom. In this embodiment, the five types of fixing sections 391, 392, 393, 394, 395 rightly arrange and fix the upper resin member 381 and the lower resin member 383 in and to their respective predetermined positions lest their positions be shifted therefrom.

As illustrated in FIG. 25, the first fixing section 391 includes: a recessed portion 401 and a through-hole 402 provided to the upper resin member 381; a through-hole 403 provided to the sheet metal member 382; and a screw 411. The through-hole 402 is arranged inside the recessed portion 401, and penetrates through the upper resin member 381.

The screw 411 includes: a head 412 arranged in its +Z axial side; a second shaft 414 arranged in its −Z axial side; and a first shaft 413 arranged between the head 412 and the second shaft 414. On a plan view from the Z axis direction, the screw 411 has a circular shape. In the screw 411, the outer diameter (diameter) of the second shaft 414 is smaller than the diameter of the first shaft 413, which is smaller than the diameter of the head 412. Like the sheet metal member 382, the screw 411 is made of a metal (for example, iron).

Furthermore, a helical groove (not illustrated) that allows the second shaft 414 of the screw 411 to be screwed together is formed in the through-hole 403.

With this configuration, in the first fixing section 391, the screw 411 is screwed into the through-hole 403 of the sheet metal member 382, as well as the upper resin member 381 and the sheet metal member 382 are put in place and fixed together by the screw 411.

In this embodiment, a clearance is formed between the metal-made components (the sheet metal member 382 and the screw 411) of the first fixing section 391 and the resin-made component (the upper resin member 381) of the first fixing section 391.

To put it specifically, the screw 411 is arranged in a way that the head 412 is in contact with a bottom surface 401a of the recessed portion 401 of the upper resin member 381, and thereby a clearance 414a is provided between the upper resin member 381 and the sheet metal member 382. In addition, the dimension of the clearance 414a is approximately 0.1 mm.

It should be noted that a configuration in which a clearance is provided between the head 412 and the bottom surface 401a of the recessed portion 401 of the upper resin member 381 may be employed instead of the configuration in which the clearance 414a is provided between the upper resin member 381 and the sheet metal member 382. Otherwise, a configuration may be employed in which: one clearance is provided between the upper resin member 381 and the sheet metal member 382; and the other clearance is provided between the head 412 and the bottom surface 401a of the recessed portion 401 of the upper resin member 381.

The first shaft 413 of the screw 411 is arranged inside the through-hole 402 of the upper resin member 381, and a clearance 413a is provided between the first shaft 413 of the screw 411 and the through-hole 402 of the upper resin member 381. The clearance 413a between the first shaft 413 and the through-hole 402 is provided to both the −X axial side from the first shaft 413 of the screw 411 and the +X axial side from the first shaft 413 of the screw 411. In addition, the dimension of the clearance 413a is approximately 0.3 mm.

It should be noted that the dimension of the clearance 413a provided to the −X axial side from the first shaft 413 of the screw 411 and the dimension of the clearance 413a provided to the +X axial side from the first shaft 413 of the screw 411 may be equal to each other, or may be different from each other.

The upper resin member 381 is a member that is longer in the X axis direction. The resin from which to make the upper resin member 381 is flexible and easy to deform compared with the metal from which to make the sheet metal member 382. In addition, in a case where the upper resin member 381 is molded from the resin, the upper resin member 381 is easy to warp due to heat applied during the molding process. For this reason, it is difficult to finish the resin-made upper resin member 381 into the target shape.

Since the sheet metal member 382 is made from the metal, the mechanical strength and the mechanical precision of the sheet metal member 382 can be made higher than if it would be made from a resin. For this reason, the sheet metal member 382 can be processed into the target shape.

Once the upper resin member 381 and the sheet metal member 382 are fixed together using the screw 411, the shape of the upper resin member 381 is corrected corresponding to the shape of the sheet metal member 382. In other words, the sheet metal member 382 plays a role of correcting the shape of the upper resin member 381.

However, the coefficient of thermal expansion of the upper resin member 381 is different from that of the sheet metal member 382, and the coefficient of thermal expansion of the upper resin member 381 is greater than that of the sheet metal member 382. Thus, when the external member 380 is heated, the upper resin member 381 expands more than the sheet metal member 382. If the upper resin member 381 and the sheet metal member 382 were fastened using the screw 411, the difference in the coefficient of thermal expansion between the upper resin member 381 and the sheet metal member 382 would deform the upper resin member 381 when the external member 380 is heated.

In the first fixing section 391, the clearance of approximately 0.1 mm is provided between the upper resin member 381 and the sheet metal member 382. This clearance makes it possible to inhibit the problem that, when the external member 380 is heated, the upper resin member 381 and the sheet metal member 382 interfere in each other, and the upper resin member 381 accordingly becomes deformed. In addition, the Z axial distance between the upper resin member 381 and the sheet metal member 382 is controlled to be equal to or less than 0.1 mm. In other words, the fixing of the upper resin member 381 and the sheet metal member 382 using the screw 411 in the first fixing section 391 corrects the shape of the upper resin member 381 corresponding to the shape of the sheet metal member 382 in a way that the Z axial distance between the upper resin member 381 and the sheet metal member 382 becomes equal to or less than 0.1 mm.

Furthermore, since like the sheet metal member 382, the screw 411 is made from the metal, the screw 411 expands more than the upper resin member 381 when the external member 380 is heated. However, the clearance of 0.3 mm provided between the screw 411 and the upper resin member 381 makes it possible to inhibit the problem that, when the screw 411 expands more than the upper resin member 381 due to the heating of the external member 380, the upper resin member 381 and the sheet metal member 382 interfere in each other, and the upper resin member 381 accordingly becomes deformed.

The second fixing section 392 has the same configuration as does the first fixing section 391, although not illustrated. In other words, a clearance is provided between the metal-made components (the sheet metal member 382 and the screw 411) of the second fixing section 392 and the resin-made component (the lower resin member 383) of the second fixing section 392.

In the second fixing section 392, the clearance of approximately 0.1 mm is provided between the lower resin member 383 and the sheet metal member 382. This makes it possible to inhibit the problem that, when the external member 380 is heated, the sheet metal member 382 and the lower resin member 383 interfere in each other, and the lower resin member 383 accordingly become deformed. In addition, the Z axial distance between the sheet metal member 382 and the lower resin member 383 is controlled to be equal to or less than 0.1 mm. In other words, the fixing of the sheet metal member 382 and the lower resin member 383 using the screw 411 in the second fixing section 392 corrects the shape of the lower resin member 383 corresponding to the shape of the sheet metal member 382 in a way that the Z axial distance between the sheet metal member 382 and the lower resin member 383 becomes equal to or less than 0.1 mm.

As illustrated in FIG. 26, in the fourth fixing section 394, the lower resin member 383 is provided with a boss portion (a projecting portion) 421 that projects in the +Z axis direction, and the sheet metal member 382 is provided with a boss hole 422. In the fourth fixing section 394, the sheet metal member 382 and the lower resin member 383 are put in place and fixed together by fitting the boss portion 421 of the lower resin member 383 into the boss hole 422 of the sheet metal member 382.

The third fixing section 393 has the same configuration as does the fourth fixing section 394, although not illustrated. In the third fixing section 393, the upper resin member 381 is provided with a boss portion (a projecting portion) that projects in the −Z axis direction, and the sheet metal member 382 is provided with a boss hole. In the third fixing section 393, the upper resin member 381 and the sheet metal member 382 are put in place and fixed together by fitting the boss portion of the upper resin member 381 into the boss hole of the sheet metal member 382.

As illustrated in FIG. 27, in the fifth fixing section 395, the upper resin member 381 is provided with a boss portion (a projecting portion) 416 that projects in the −Z axis direction, and the lower resin member 383 is provided with a column portion 417 that projects in the +Z axis direction. In addition, an upper resin member 381-facing surface of the column portion 417 is provided with a boss hole 418 into which the boss portion (the projecting portion) 416 can be fitted. In the fifth fixing section 395, the upper resin member 381 and the lower resin member 383 are put in place and fixed together by fitting the boss portion 416 of the upper resin member 381 into the boss hole 418 provided to the column portion 417 of the lower resin member 383.

As discussed above, in the fixing sections (the third fixing section 393, the fourth fixing sections 394 and the fifth fixing sections 395), the sheet metal member 382 and the resin members 381, 383 can be put in place with no consideration given to the difference in the coefficient of expansion between of each two of the sheet metal member 382 and the resin members 381, 382, specifically, with no clearance provided between them. On the other hand, the problem resulting from the difference in the coefficient of expansion between the sheet metal member 382 and each of the resin members 381, 382 is addressed by the fixing sections (the first fixing sections 391 and the second fixing sections 392) arranged in the X axial end portions and the Y axial end portions of the external member. This configuration makes it possible to securely put the sheet metal member 382 and the resin members 381, 382 in place with consideration given to the difference in the coefficient of expansion between the sheet metal member 382 and each of the resin members 381, 382.

As discussed above, in this embodiment, the five types of fixing sections 391, 392, 393, 394, 395 put the upper resin member 381, the sheet metal member 382 and the lower resin member 383 in place.

In addition, the problem of difficulty in finishing the external member 380 into the configuration target shape which would be caused if the external member 380 were formed from the upper resin member 381 and the lower resin member 383 alone is solved by: providing the precisely-processable sheet metal member 382 between the upper resin member 381 and the lower resin member 383; and forcing the shapes of the upper resin member 381 and the lower resin member 383 to emulate the shape of the sheet metal member 382.

Accordingly, the external member 380 can be finished into the target shape.

What is claimed is:
1. A document reader comprising:
a document reading unit that includes a mount table, and reads a document mounted on the mount table;

a cover unit that is arranged to cover an upper surface of the document reading unit, and is movable relative to the platen between an open state and a closed state;

a hinge that connects the document reading unit and the cover unit in a way that the cover unit is openable from and closable to the document reading unit by turning around a turn shaft of the hinge; and a positioning mechanism that puts the document reading unit and the cover unit in place in an apparatus front-rear direction, wherein the hinge includes a pressing member that holds the cover unit in the open state, and is arranged on a back side of the document reading unit with the turn shaft located above the pressing member and with a pressing direction of the pressing member coinciding with a direction in which the cover unit covers the document reading unit, and the positioning mechanism includes
- an engaging portion located below the turn shaft, and arranged on a surface of the hinge that intersects an axial direction of the turn shaft,
- an engaged portion that is formed in the document reading unit, and is engaged with the engaging portion, and
- a pressing portion that is located below positions of the engaging portion and the engaged portion, and presses a lower part of the hinge from the back side of the document reading unit.

2. The document reader according to claim 1, wherein the engaging portion is formed on a case that houses the pressing member, and the pressing member presses the case.

3. The document reader according to claim 1, wherein a plurality of the hinges are arranged, and the positioning mechanism is used to put the document reading unit and the hinges in place in the apparatus front-rear direction.

4. The document reader according to claim 1, wherein the mount table includes a first recessed portion on which to mount the document, and the cover unit includes a document cover unit that is arranged to internally contact the first recessed portion in the closed state.

5. The document reader according to claim 1, wherein the document reading unit includes a reading window through which to read a document being transported, and the cover unit includes a document transporter that transports the document to the reading window.

6. The document reader according to claim 1, further comprising:

a second recessed portion formed on a free end side of the cover unit at least away from the document reading unit; and a projecting portion arranged on the document reading unit, wherein the positioning mechanism is fixed in a state where the document reading unit and the cover unit are put in place with the second recessed portion and the projecting portion engaged with each other.

7. The document reader according to claim 6, wherein the projecting portion is detachably attachable to a third recessed portion formed in the document reading unit, and in an attached state, the document reading unit and the cover unit are put in place with the projecting portion fitted in the second recessed portion of the cover unit.

8. The document reader according to claim 7, wherein the document reading unit is openable from a structure under the document reading unit by turning around a turn axis located below the turn shaft of the hinge, and the second recessed portion is formed from a through-hole, the third recessed portion to which the projecting portion is detachably attachable includes a second through-hole that is opened to an inside of the document reading unit when the projecting portion is detached from the third recessed portion, and the cover unit and the document reading unit are fastened together using the through-hole and the second through-hole.

* * * * *